Feb. 28, 1928.  
L. C. WARNER  
1,660,638
ADDING MACHINE
Filed Nov. 26, 1920    15 Sheets-Sheet 1
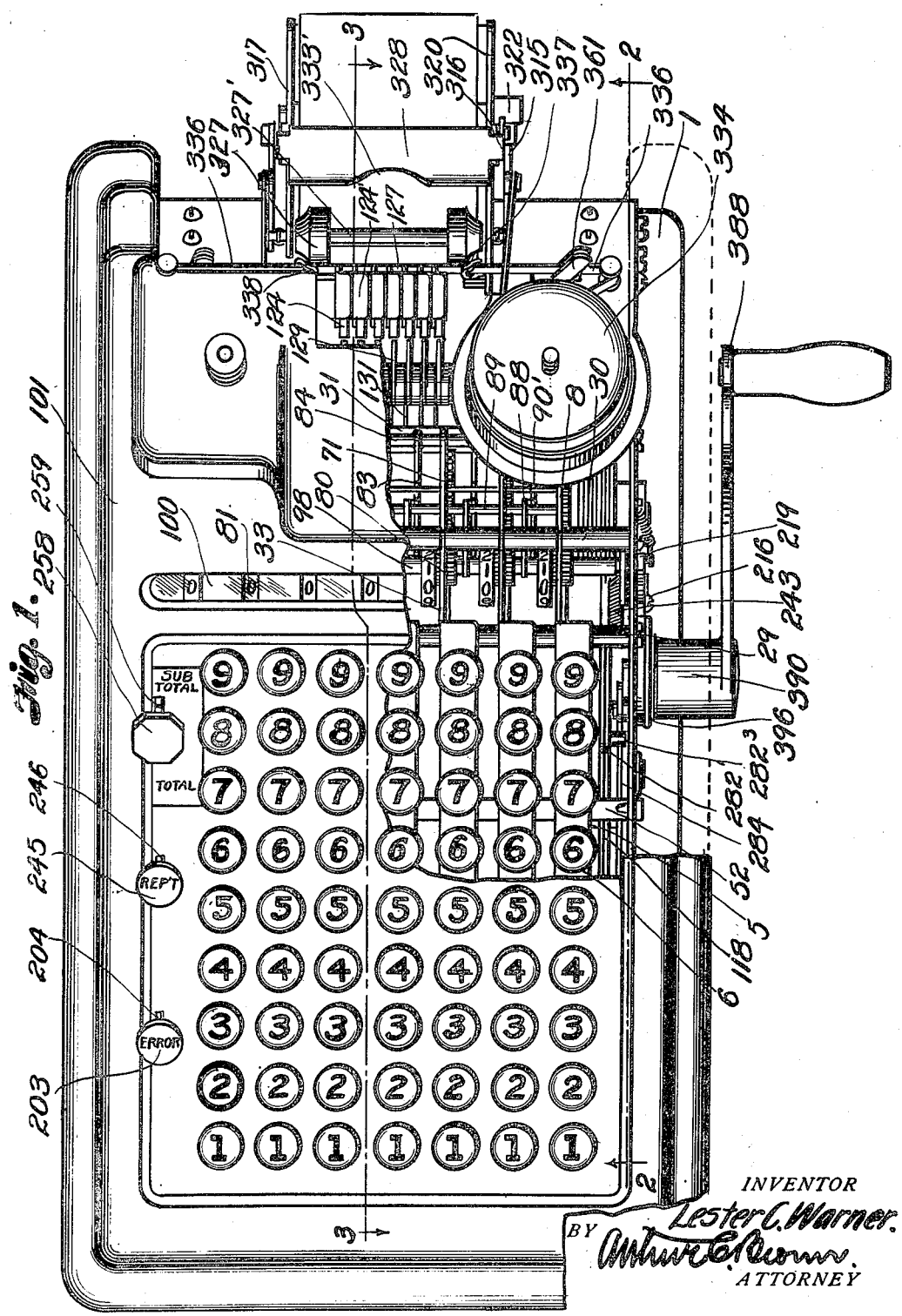
INVENTOR  
Lester C. Warner.  
BY Arthur E. Brown  
ATTORNEY

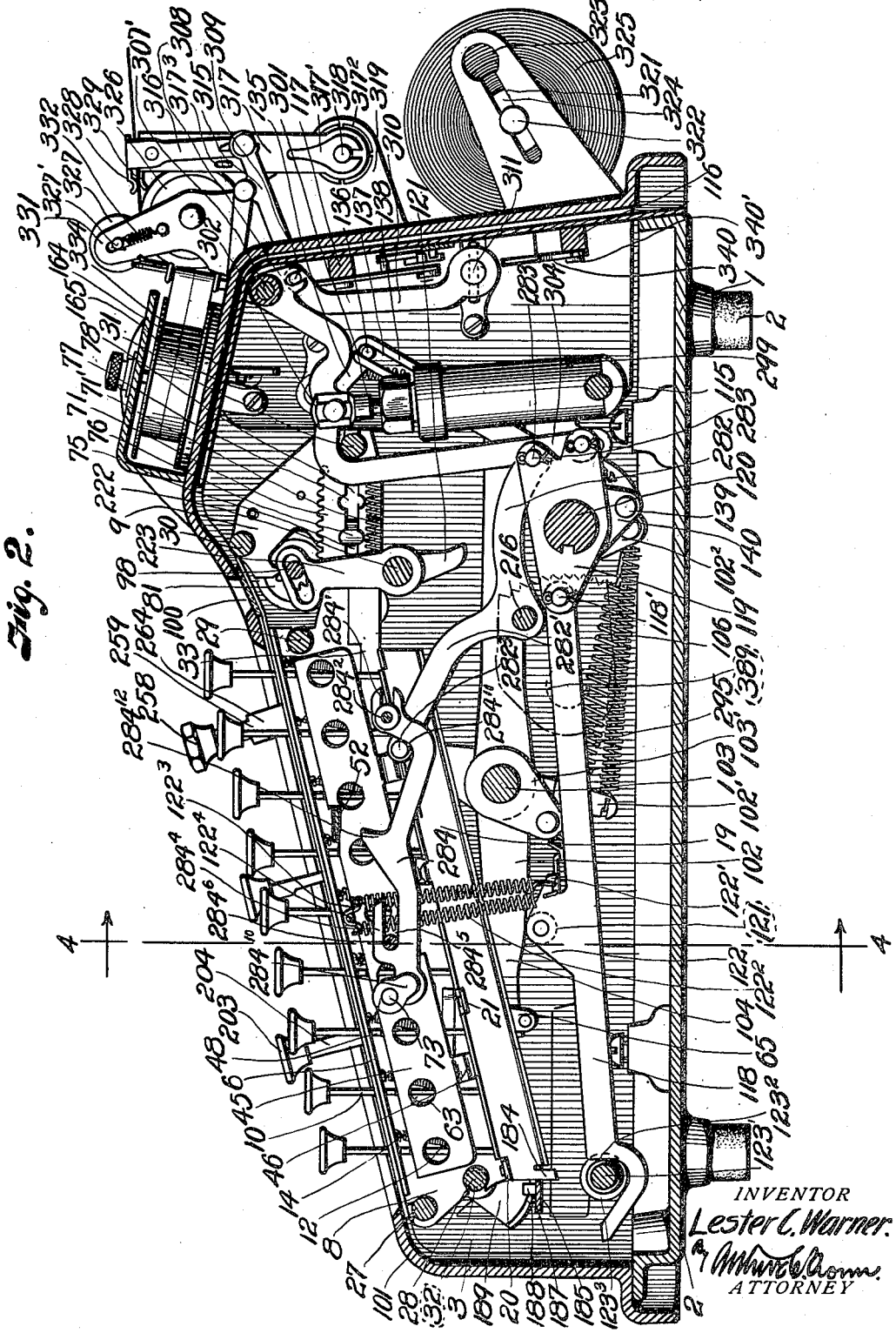

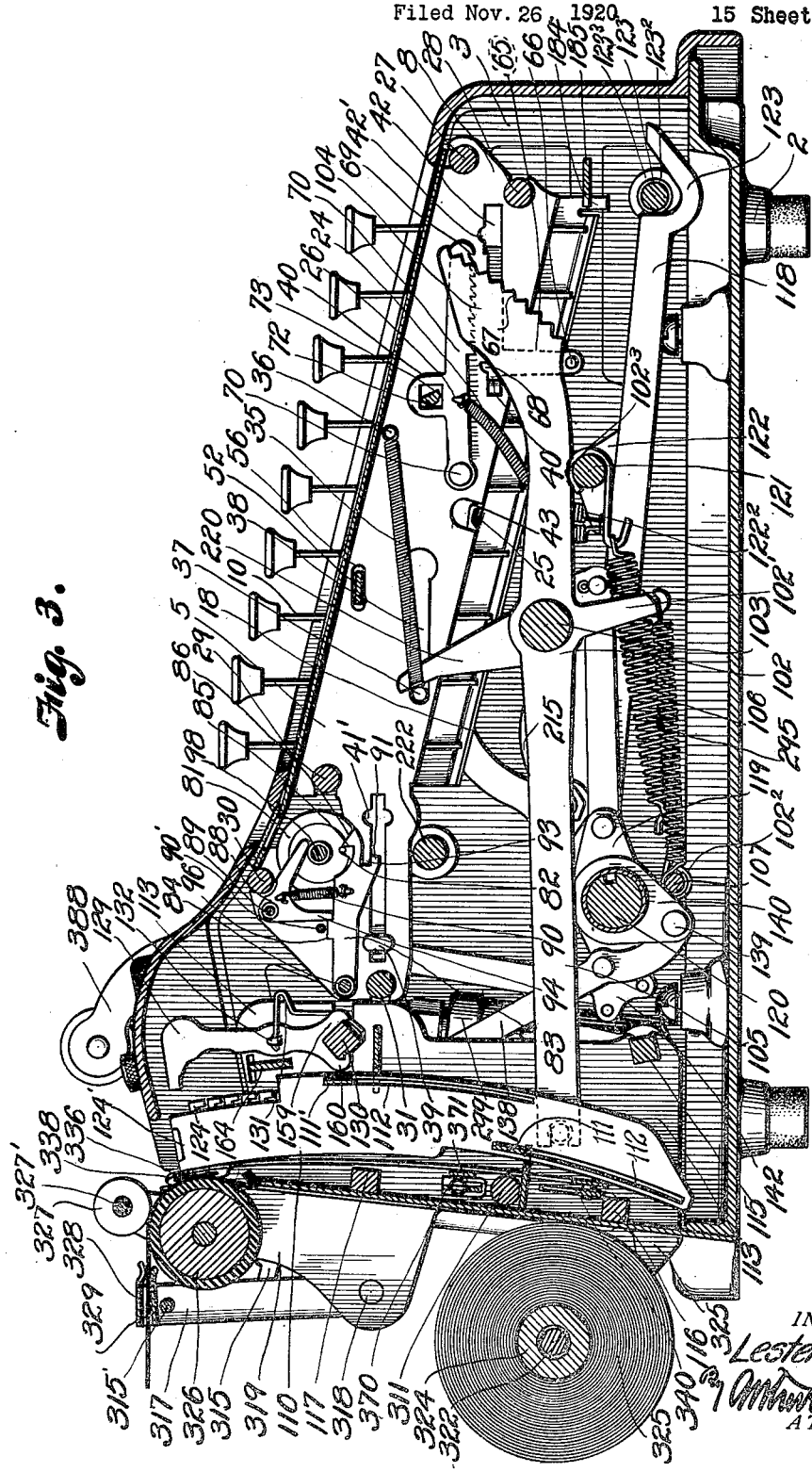

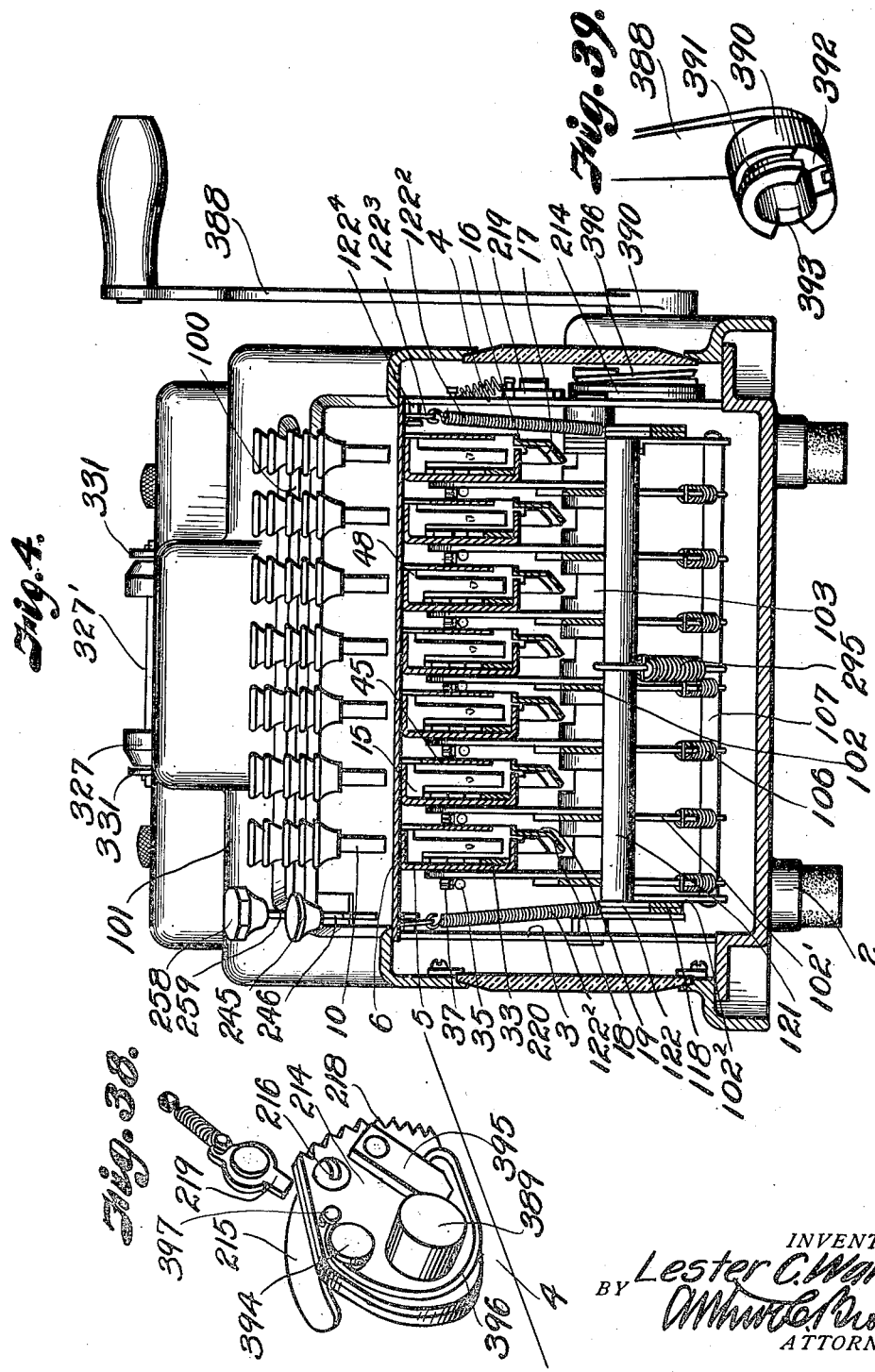

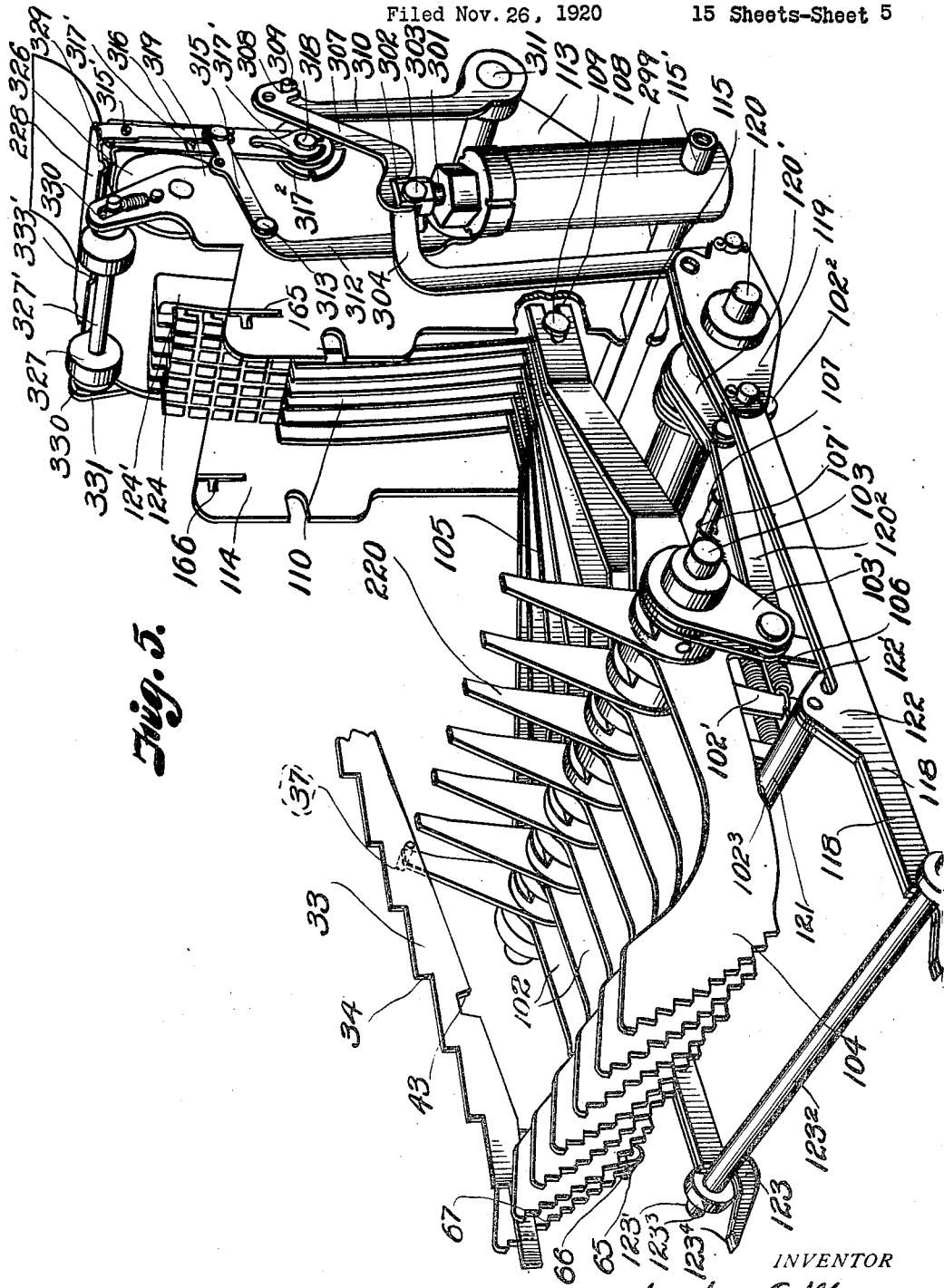

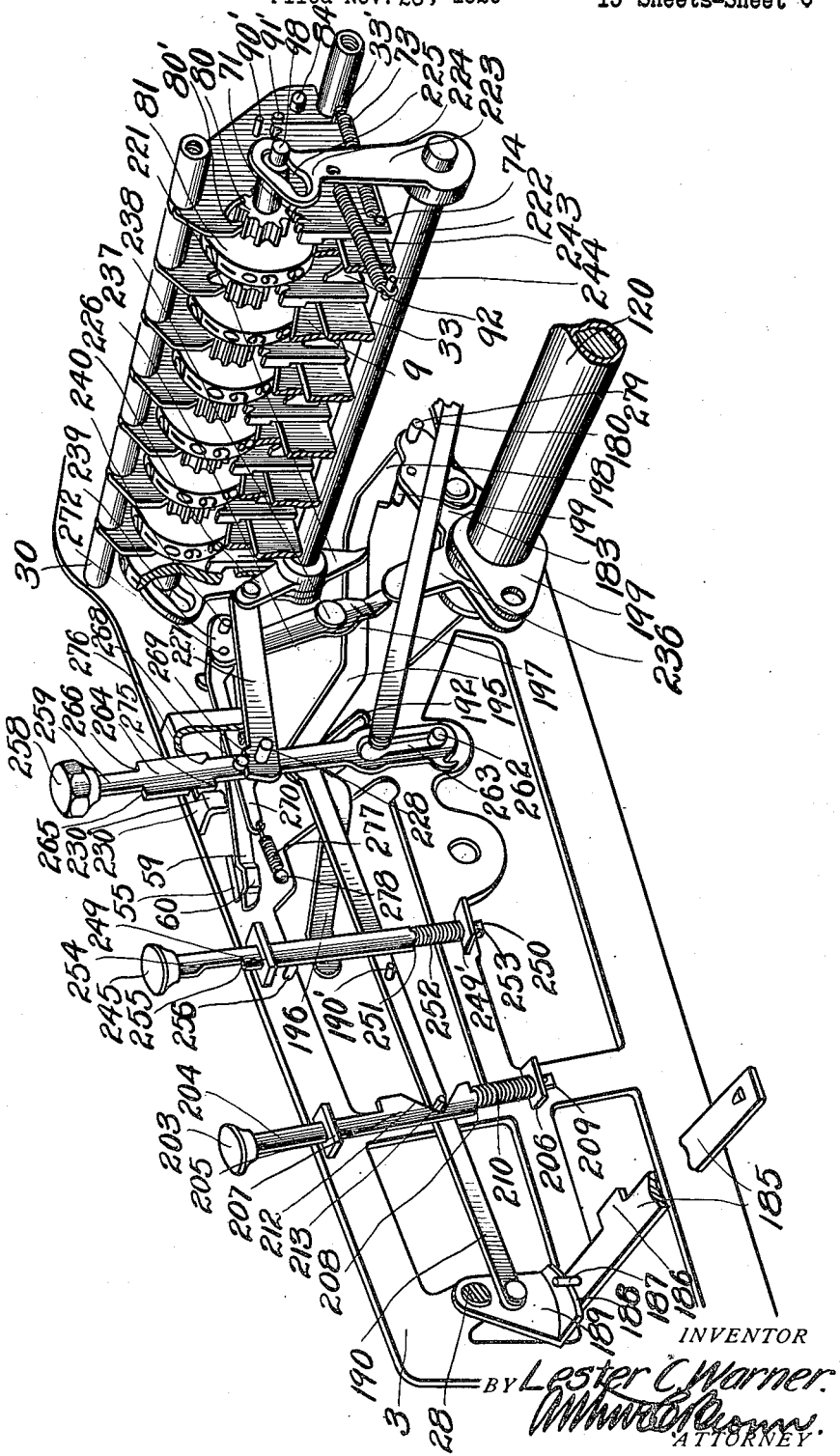

Feb. 28, 1928.  1,660,638
L. C. WARNER
ADDING MACHINE
Filed Nov. 26, 1920 15 Sheets-Sheet 7
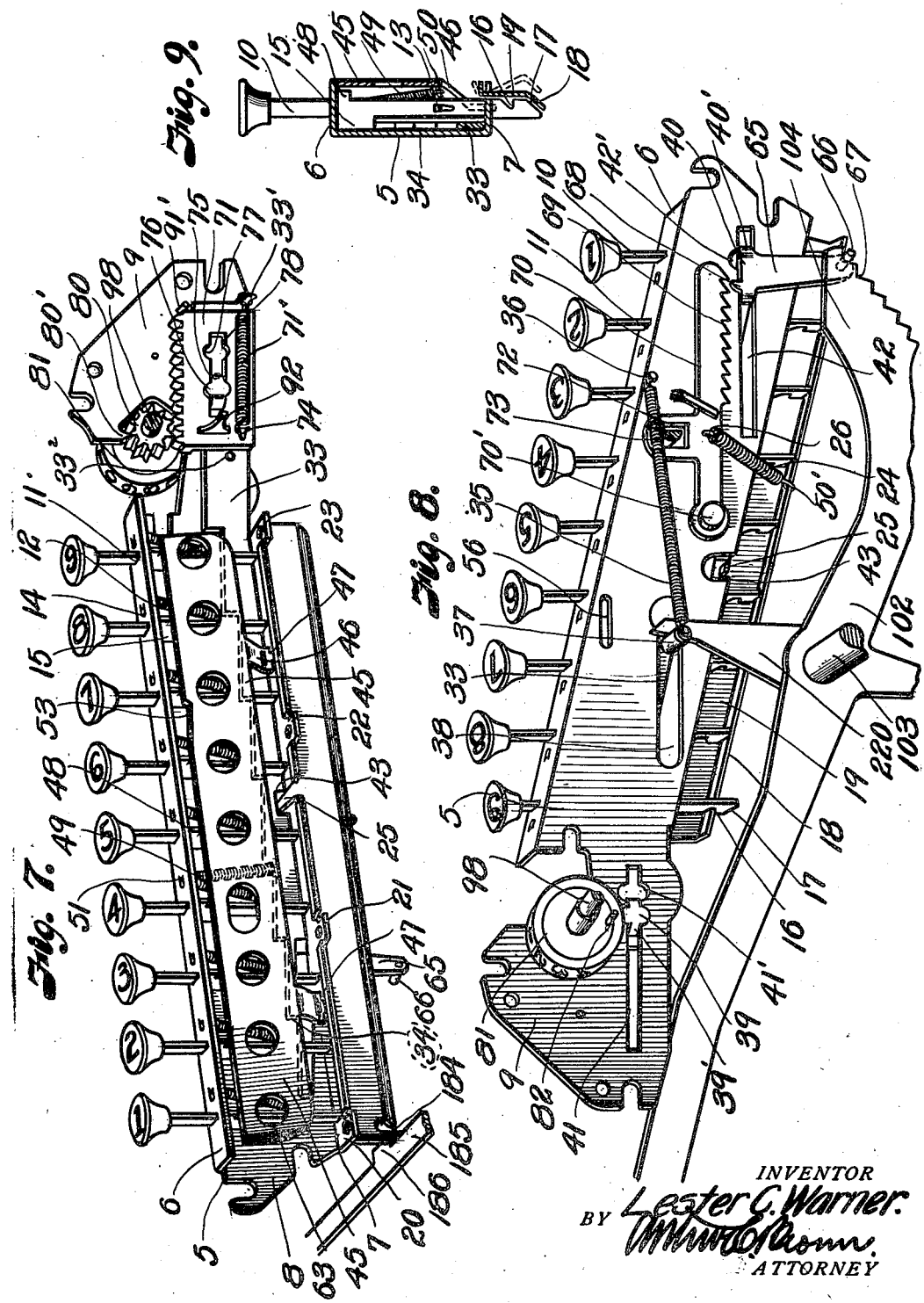
INVENTOR
Lester C. Warner.
BY
ATTORNEY

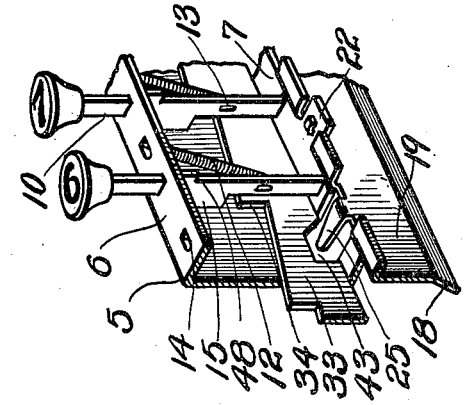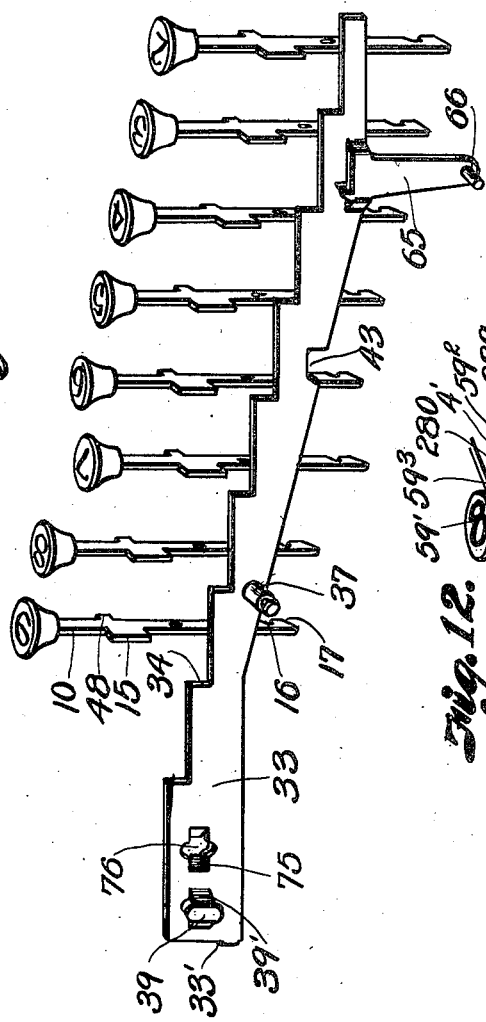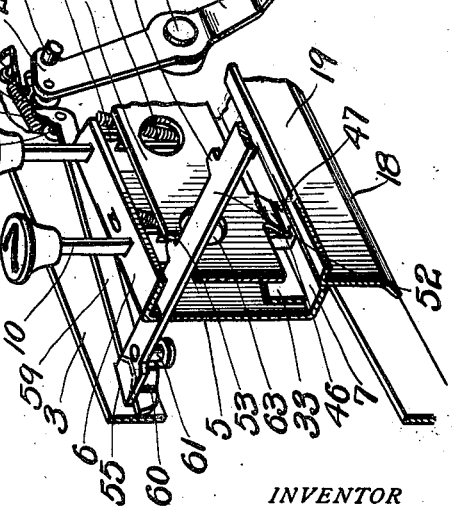

Feb. 28, 1928.                                                                1,660,638
                          L. C. WARNER
                         ADDING MACHINE
                       Filed Nov. 26, 1920          15 Sheets-Sheet 9
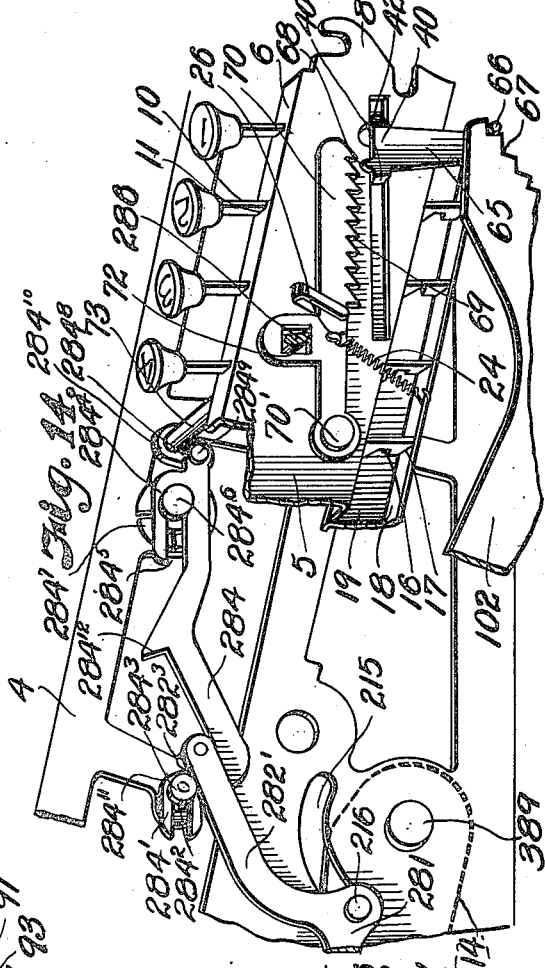
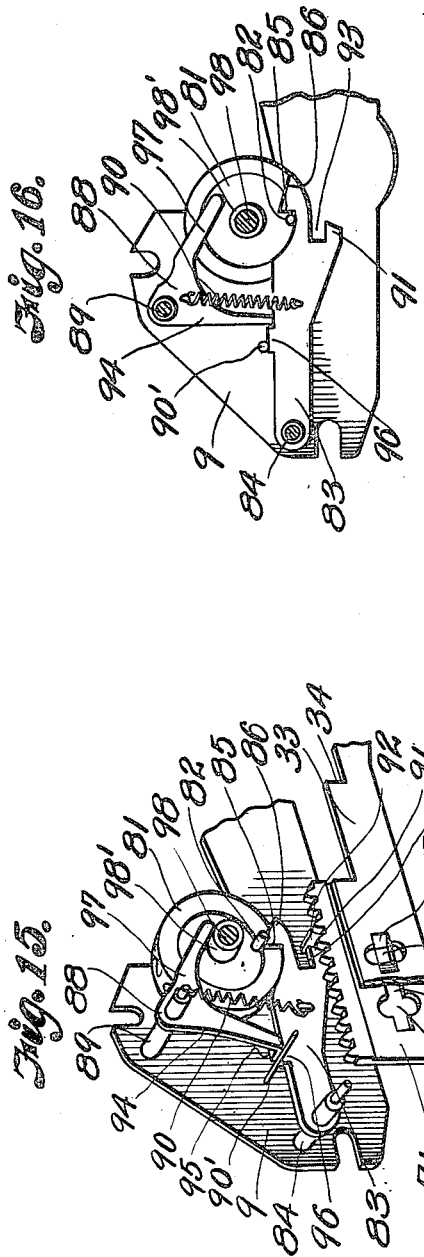
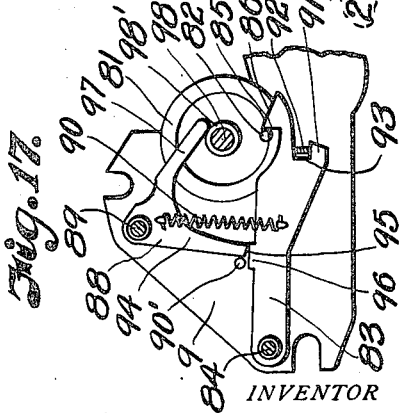
INVENTOR
BY *Lester C. Warner.*
*[signature]*
ATTORNEY

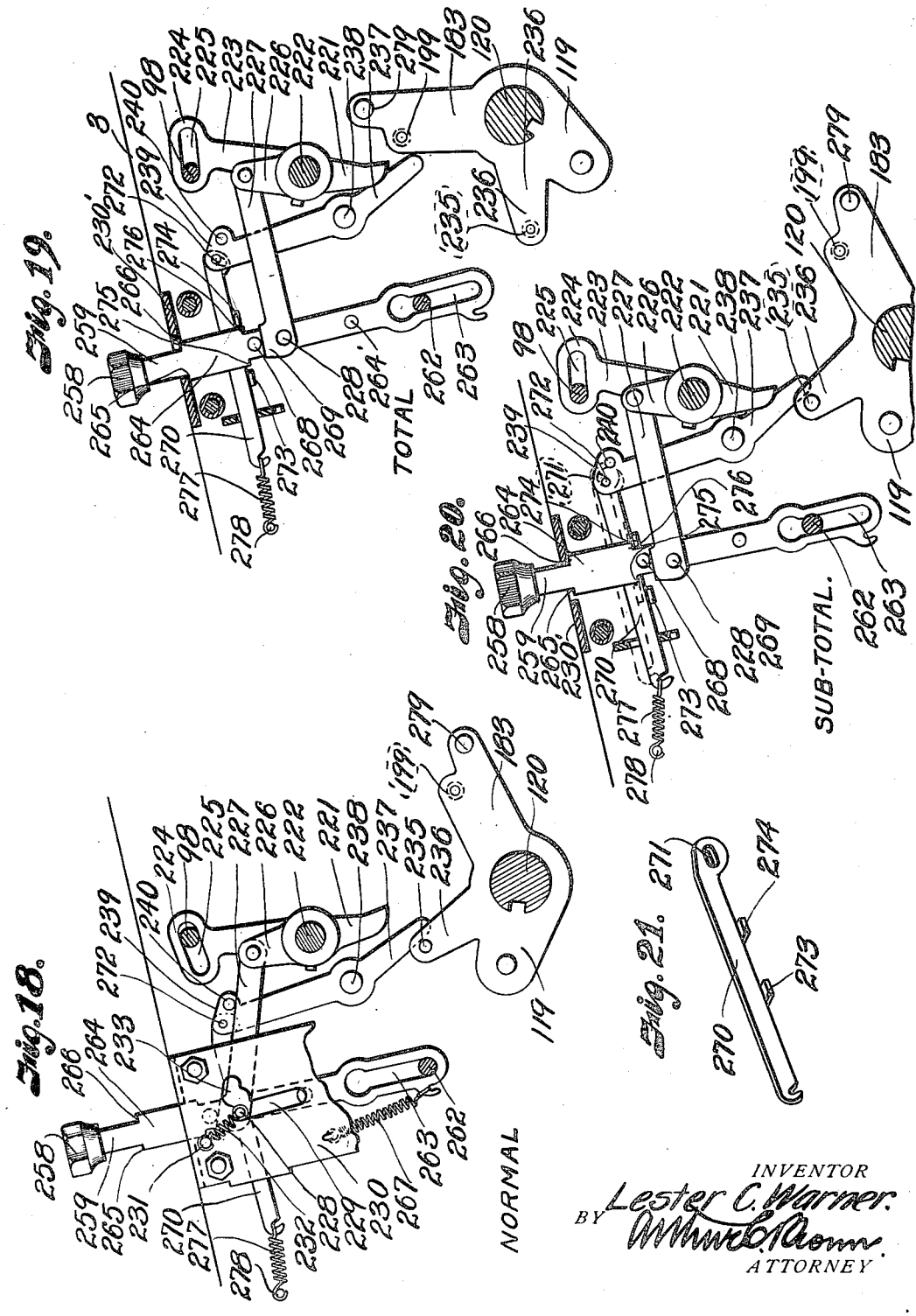

Feb. 28, 1928.
L. C. WARNER
1,660,638
ADDING MACHINE
Filed Nov. 26, 1920
15 Sheets-Sheet 11
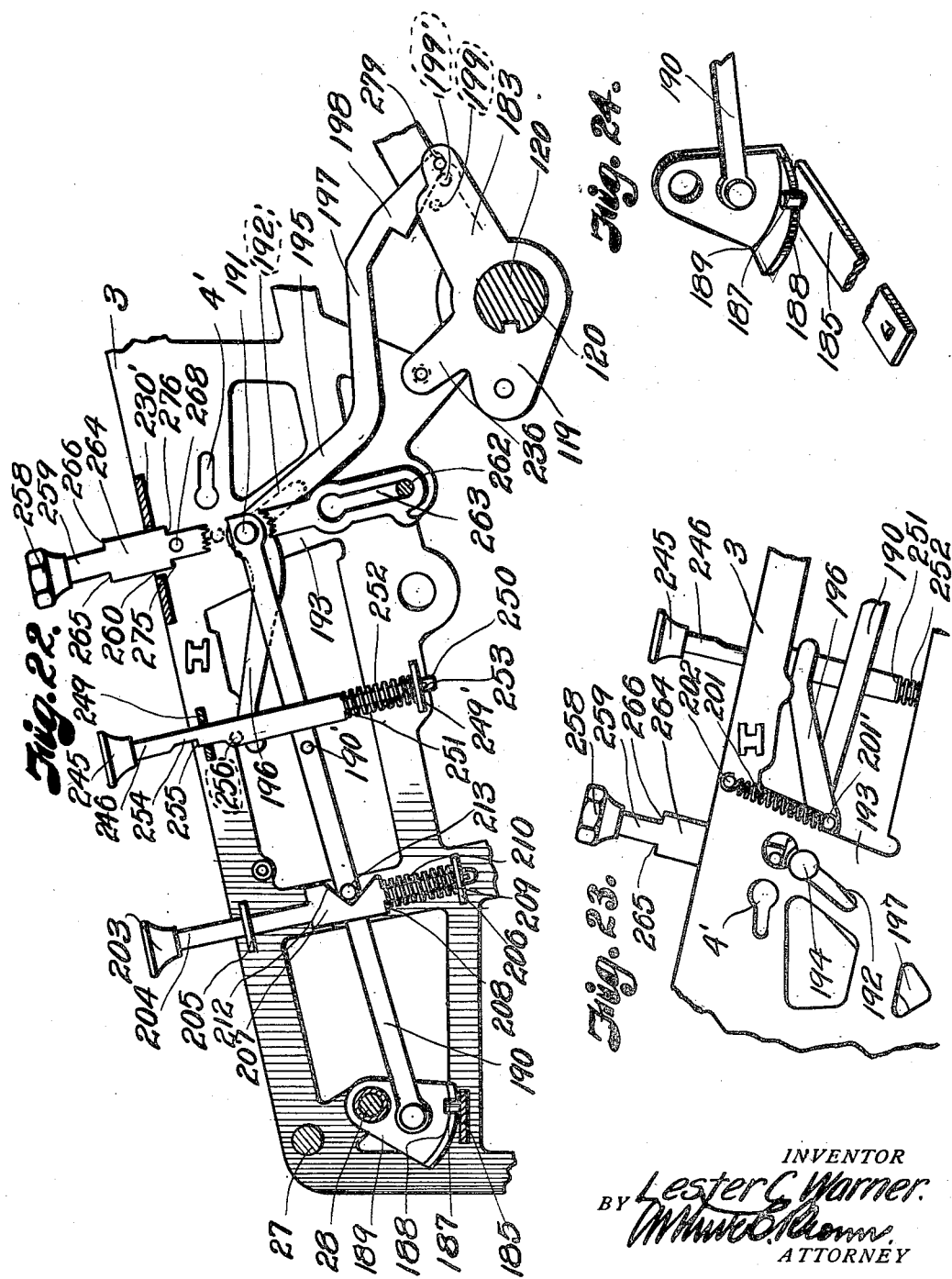
INVENTOR
BY *Lester C. Warner.*
ATTORNEY

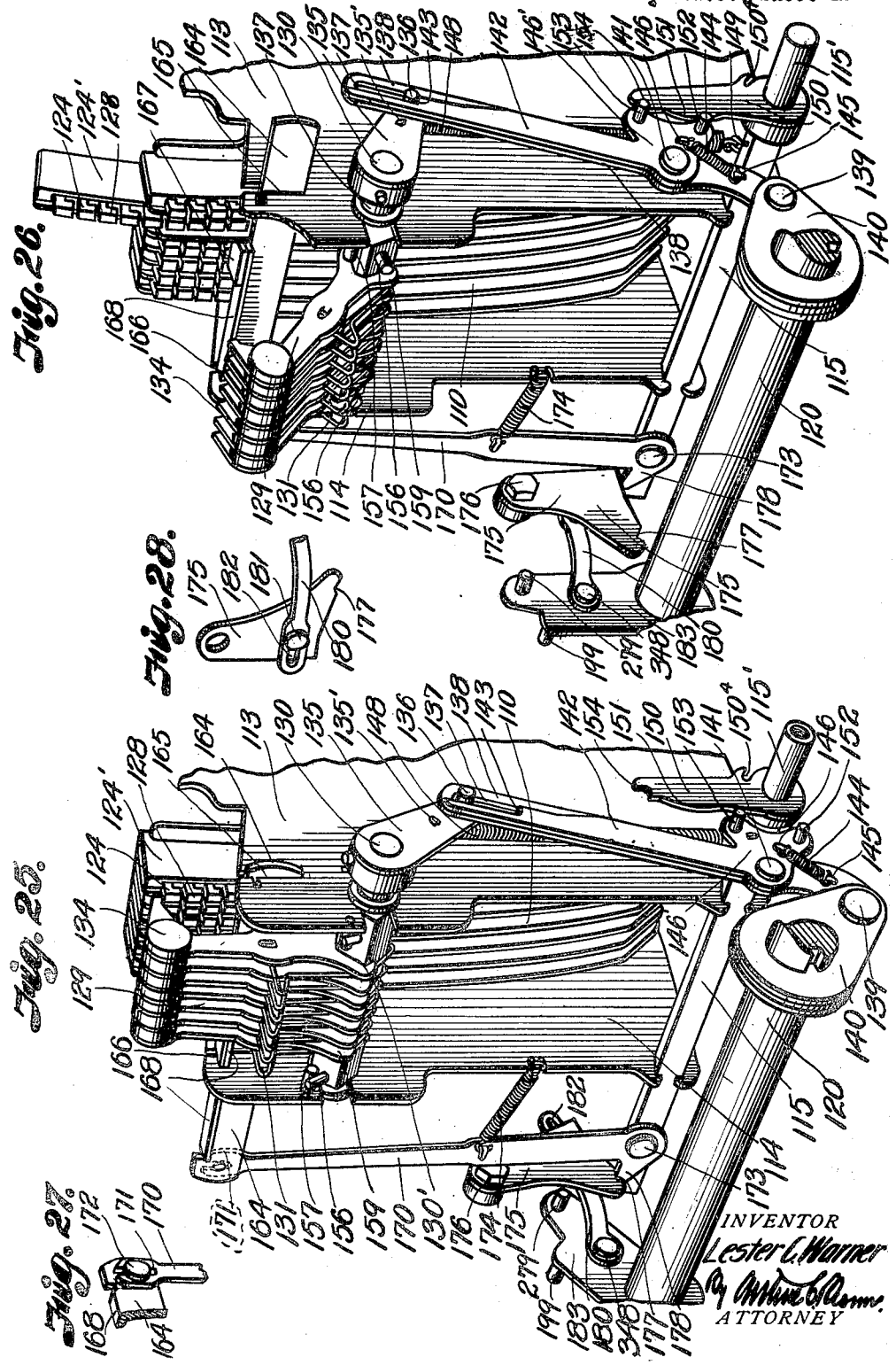

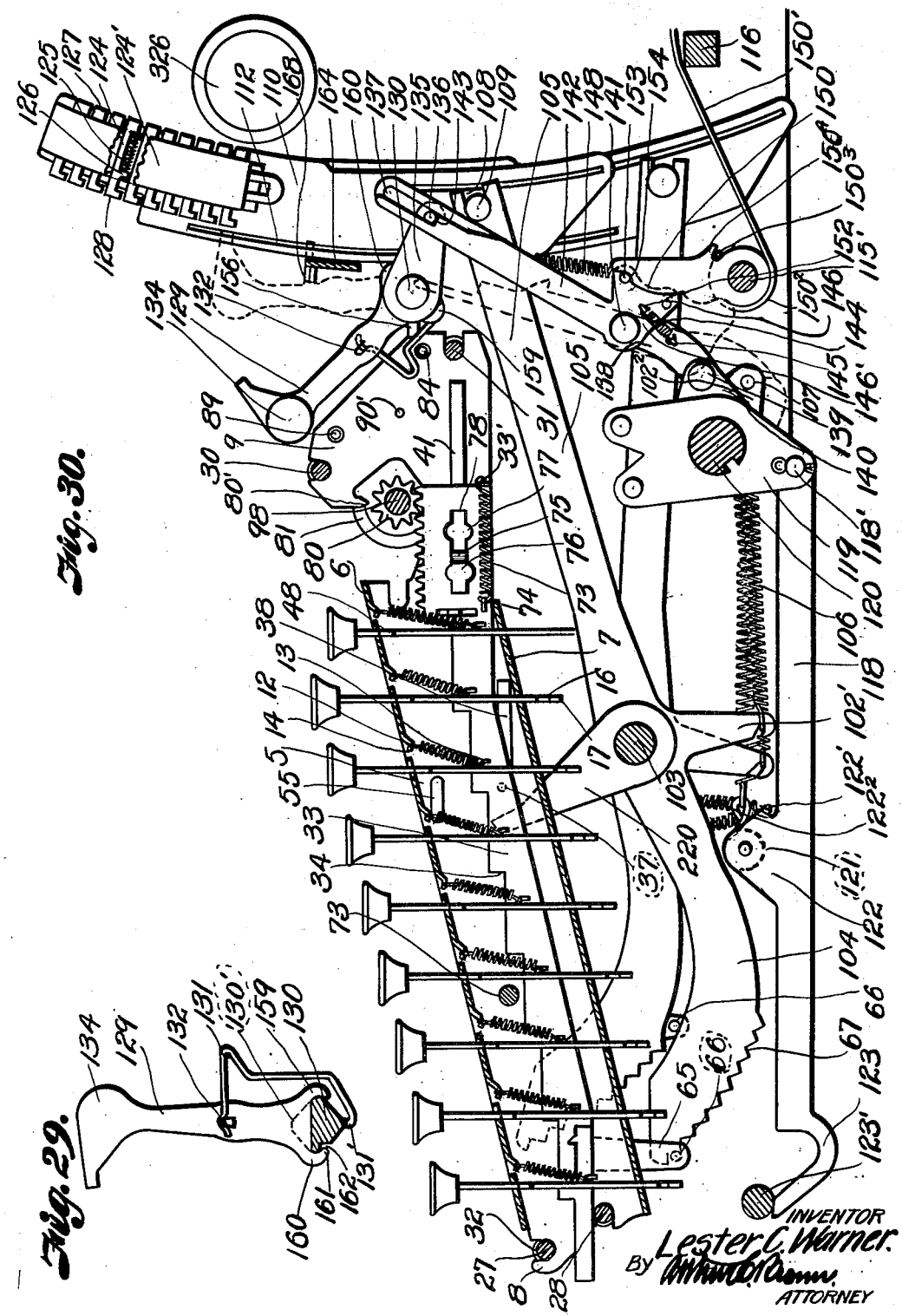

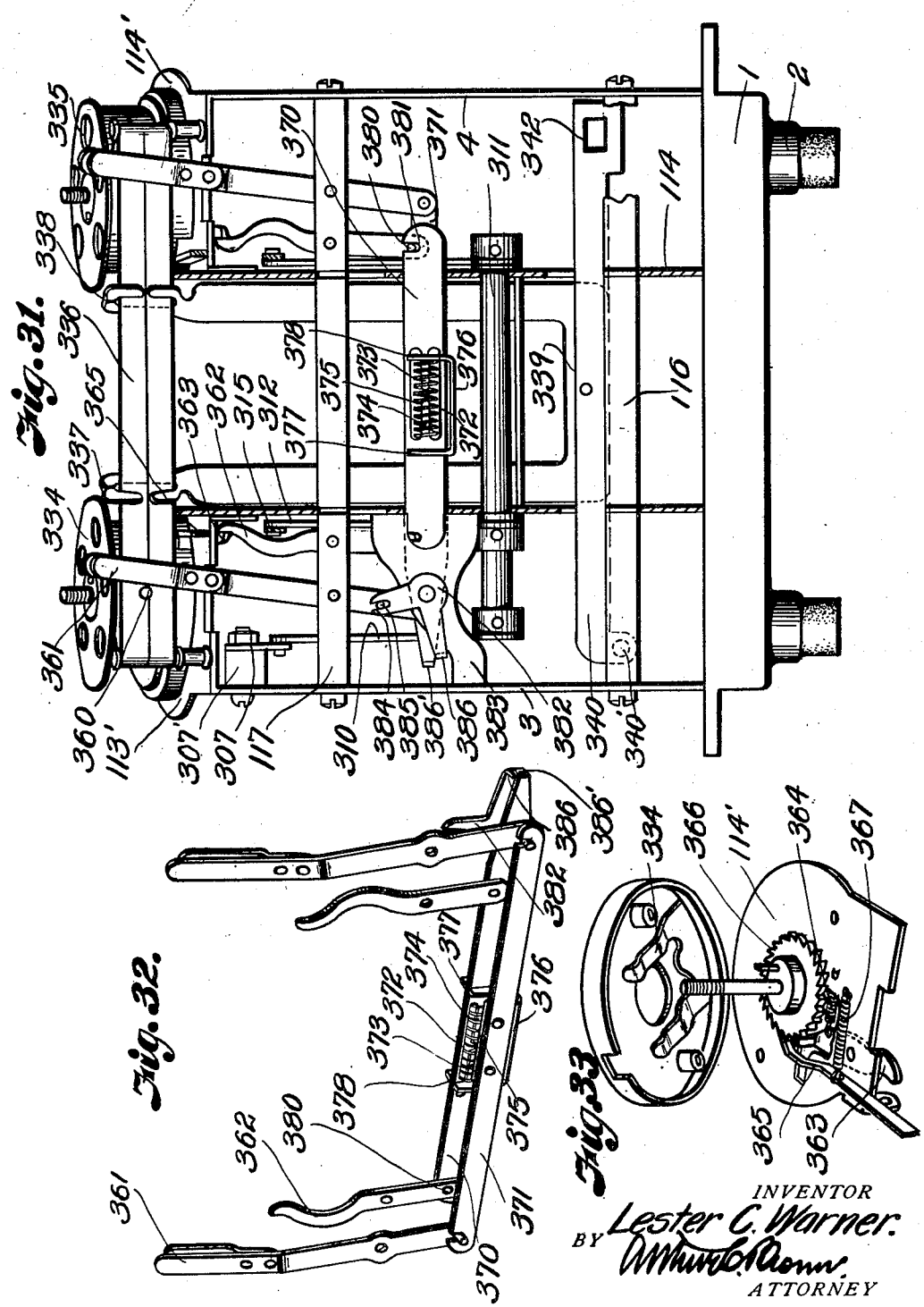

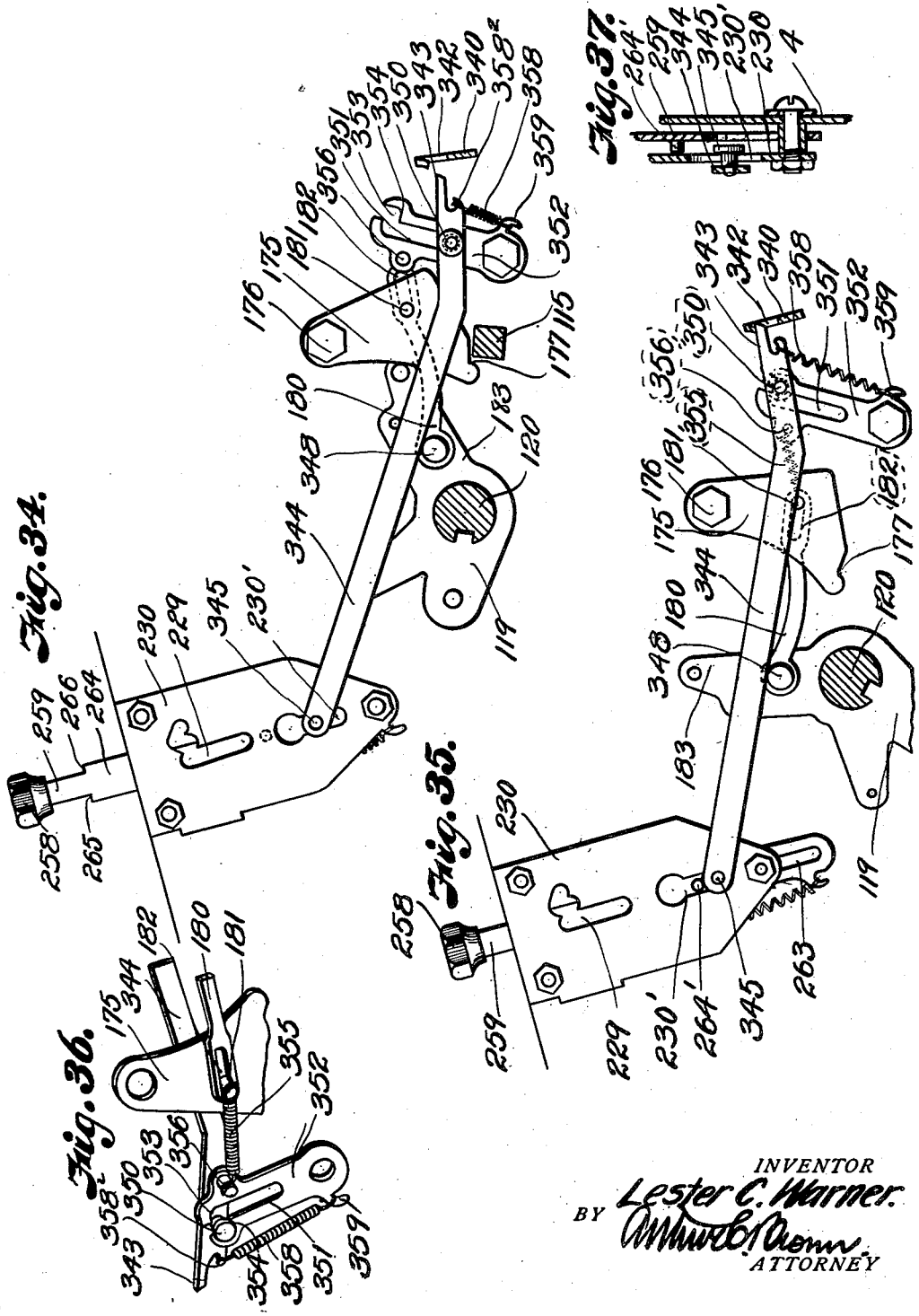

Patented Feb. 28, 1928.

1,660,638

UNITED STATES PATENT OFFICE.

LESTER C. WARNER, OF KANSAS CITY, MISSOURI, ASSIGNOR, BY MESNE ASSIGNMENTS, TO INTERNATIONAL ACCOUNTING MACHINE CO., OF NEW YORK, N. Y., A CORPORATION OF DELAWARE.

ADDING MACHINE.

Application filed November 26, 1920. Serial No. 426,576.

This invention relates to adding machines of the flexible keyboard type shown in United States Letters Patent No. 1,285,156, issued November 19, 1918, to Benjamin P. Hayes and Frank D. Laughlin, and in the application of Benjamin P. Hayes, filed February 27, 1920, Serial No. 361,743, the present invention contemplating improvement in details of construction whereby the manufacture and operation of the machine may be simplified and facilitated.

One of the principal objects of the invention is to stabilize operation of the machine by substantially equalizing spring tensions throughout the full throw of the crank.

It is another object of the invention to insure smooth and accurate operation of the type sectors by improvement in the sector guiding means.

It is a further object of the invention to insure operation of the type-hammer push arm by positive seating and unseating elements.

It is a further object of the invention to facilitate release of the register shift by advantageous lever contacts.

It is a further object of the invention to improve details of construction of the form of machine illustrated in said pending application, and as the machine forming the subject matter of the present application is identical with that of said pending application, except for the improvements noted and hereafter specified, the present description follows that of the former one, except where the improvements require departure.

In the drawings:

Fig. 1 is a plan view of the machine, part of the case being broken away to disclose the operating mechanism.

Fig. 2 is a vertical, longitudinal, sectional view through the machine, on the line 2—2, of Fig. 1.

Fig. 3 is a similar view on the line 3—3, Fig. 1.

Fig. 4 is a transverse, vertical section on the line 4—4, Fig. 2.

Fig. 5 is a detail perspective view of the main and secondary shafts and co-operating mechanism.

Fig. 6 is a similar view of the main shaft, the register and the total, repeat and error keys.

Fig. 7 is a perspective view of a key frame, illustrating the selecting bar and its relation to a corresponding register wheel.

Fig. 8 is a similar view from the opposite side of the frame.

Fig. 9 is a vertical section of part of a key frame unit, particularly illustrating the wing latch.

Fig. 10 is a diagrammatic view of a selecting bar and its bank of keyposts, one of the posts being shown in stop position.

Fig. 11 is a perspective view of part of a key frame unit, particularly illustrating the cipher stop.

Fig. 12 is a detail perspective view of part of a key frame, illustrating the key post safety locked in idle position.

Fig. 13 is a similar view showing the safety lock in functional position.

Fig. 14 is a detail perspective view of operating mechanism for the selecting bar safety locks or detents.

Figs. 15, 16 and 17 are detail views of the transfer and total-taking stop mechanism.

Fig. 18 is an elevation of the total key and related parts.

Fig. 19 is a view of the total key and related parts in total-taking position.

Fig. 20 is a view of the total key and related parts in sub-total-taking position.

Fig. 21 is a detail perspective view of the total key lock and shift bar.

Fig. 22 is an elevational view of the total, repeat and error keys, and wing latch shift cam, with related parts.

Fig. 23 is an elevation of the opposite side of the frame, particularly illustrating the total-key guide pin.

Fig. 24 is a detail perspective view of the wing latch shift cam and bar.

Fig. 25 is a perspective view of the printing mechanism, in normal position, particularly illustrating its operative connection with the main shaft.

Fig. 26 is a similar view, showing the hammers set, ready to strike.

Fig. 27 is a detail perspective view of the connection between the hammer rail and its operating lever.

Fig. 28 is a detail perspective view of the hammer rail lever cam and its operating link.

Fig. 29 is a detail perspective view of a type hammer and its mounting.

Fig. 30 is an elevational view of the type-positioning and printing mechanism.

Fig. 31 is a detail elevation of the printing ribbon reversing mechanism, looking from the rear of the machine.

Fig. 32 is a detail perspective view of the ribbon reversing bars.

Fig. 33 is a detail perspective view of a ribbon drum and part of the reversing mechanism.

Fig. 34 is a detail view of the ribbon shift (black to red) mechanism, illustrating its operation from the total key and main shaft.

Fig. 35 is a similar view of the parts after a shift.

Fig. 36 is a detail perspective view of the ribbon shift latch.

Fig. 37 is a detail view of the total key guide plate, illustrating the setting control of the post with the ribbon shift bar.

Fig. 38 is a detail perspective view of the full throw ratchet, illustrating the crank latch.

Fig. 39 is a detail perspective view of the crank hub, illustrating the latch slots and grooves.

Referring to the drawings by numerals of reference:

A base 1, Figs. 2, 3 and 4, mounted upon the feet or legs 2 in the usual manner, carries side frames 3 and 4 whereby certain parts of the operating mechanism are supported in proper relative position.

Located between the side frames are register wheels and wheel operating and controlling mechanism, including key posts, the latter arranged in banks, with each bank carried by an individual frame, which is supported from the side frames 3—4, as hereinafter described.

As each key frame and its appurtenances is a mechanical double of any of the others, a detail description of one will suffice.

Key frame.

Each key frame consists of a channel member 5 (Figs. 7, 8 and 9) having upper and lower substantially parallel flanges 6 and 7, comprising guides through which the keys slide longitudinally. Each frame is shown as provided with a forwardly projecting flat wing or extension 8 and a similar, rearwardly projecting wing or extension 9, the latter constituting a bracket for supporting certain mechanism, to be presently described.

The key posts 10 slide freely in slots 11 in the frame flanges 6—7 and are spring-retracted in a manner similar to that shown in the forementioned patent and pending application, for example—by the springs 12, each of which has one end fastened to a hook 13 on its key post and the other to a struck-out spring anchor 14 on the upper frame flange 6.

Each key post has a sliding bar stop 15 (Figs. 10 to 13) and latch wing engaging notch 16, the end of the key post terminating in a cam 17 to act against the off-set edge 18 of the latch wing 19 that is hinged to the ears 20, 21, 22 and 23 on the lower flange 7 and normally held in position to be engaged by the cam 17 through the medium of a spring 24 (Fig. 8) which is attached to the edge 18 on the latch wing and to a hook 26 on the selecting bar limit lever, presently described, whereby the spring may serve the double purpose of urging the wing and lever to effect their functions.

The frames 5 are suspended in proper position within the machine by transverse rods 27 and 28 (Fig. 2) in the forward end of the machine and by rods 29, 30 and 31 at the rear end of the machine, these rods engaging cutout portions or notches in the respective wings of the frame and being terminally supported by the side frames 3 and 4. The rods 27 to 31 inclusive have grooves 32 seating in the key frame members whereby the key frames 5 are spaced equidistantly within the main frame members 3 and 4.

The key posts 10 in each bank constitute setting devices for determining the movement of a selecting bar 33 whereby the register wheel for that particular column or key bank is actuated and whereby the stop mechanism for determining the position of the type mechanism is fixed. The stop 15 on each key post is adapted to engage a relative stop 34 on the selecting bar when the post is lowered to functional position, it being understood that the key posts in each bank are numbered from 1 to 9, starting at the bottom or front of the machine, and that the amplitude of movement of a selecting bar is determined by the particular key depressed in the corresponding bank.

As movement of the selecting bar does not occur until after a key post has been lowered to functional position, means must be provided for holding any post lowered against the tension of its returning spring 12. This is accomplished when the cam 17 on the post overrides the cam edge 18 of latch wing 19 and permits the cam edge to engage the notch 16 in the key post.

Since the key posts in each bank are all substantially alike and since the cams 17 may ride over the edge of the latch wing before the latch wing engages the notch 16, it is obvious that if an incorrect key in any one bank is depressed and it is then desired to depress another key in the same bank, the downward movement of the last depressed key will cause its cam 17 to push the wing latch 19 out of engagement with the previously held key, so that the previously held key will be released, thereby enabling the operator to substitute another key for the one first depressed.

It is also apparent that in the event that it is desired to release a depressed key without locking the key by which the depressed key is released, a second key in the same bank can be moved against the action of its spring, causing the cam 17 to ride against the edge 18 of the wing latch 19, until the edge 18 is just about to ride over the end of the cam 17 into the notch 16. When the latch wing is riding on the end of the cam 17 near the notch 16, it will have moved over far enough to take its edge out of the notch 16 of any locked key and thereby permit the depressed key to be retracted by its spring 12. Therefore, if a wrong key in a bank is depressed and it is desired to release it by another key, it is only necessary to depress a second key in the bank a portion of its full stroke, as above described, whereupon the held key in that bank will be released.

Each selecting bar 33 comprises a single piece of sheet metal which is adapted to travel along the key post frame 5 between the flanges 6 and 7, the edge stops or shoulders 34 forming forwardly facing and vertically arranged stops adapted for contact with the stops 15 on an active key post when the selecting bar is forwarded by the mechanism presently described.

As explained in Patent No. 1,285,156 and in the co-pending application, each key post bank comprises nine posts. The posts have nothing to do with actuating the bars but are merely utilized to stop the bars at desired positions, the movement of each bar being effected by a spring 35 (Fig. 8) one end of which is attached to a pin 36 projecting from the frame 5 and the other end of which is connected to a pin 37 that is fixed on the selecting bar 33 and projects through the slot 38 in the key frame plate 5, so that when the selecting bar is released by operation of the crank, the spring will advance the selecting bar until it engages a depressed key post or until a cipher stop on the bar engages a stop member, as will be presently described.

Each of the bars 33 is held in the key post frame by heads 39 and 40 (Fig. 8) on necks 39' and 40' which slide in the slots 41 and 42 in the back of frame 5, the slots having enlarged portions 41', 42', through which the head 39 and a tooth 68 on head 40 respectively project to seat the necks, the arrangement being such that when the parts are assembled, the heads will prevent accidental displacement of the bar sidewise, although permitting a considerable longitudinal movement thereof.

At every operation of the machine all of the selecting bars move to advance corresponding register wheels and type carriers, the bars in each bank in which no key post is depressed being stopped at cipher position by the finger 25 on the latch wind 19 for that bank, the finger being normally seated in a slot 43 in the selecting bar 33 when the wing is in normal position, but moving out of the slot when the wing is moved by depression of any key post. With this arrangement, should the selecting bar be released by the main crank without any key post having been depressed, it will move under the tension of its spring until stopped by the finger 25, the movement being sufficient to shift the corresponding type carriers one space to effect printing of a cipher, but without shifting its register wheel one space, but should any key post in the bank have been depressed, it will, upon moving the wing, remove the finger 25 from the slot 43 so that the bar is free to move until stopped by the depressed key post.

As shown in Patent No. 1,285,156, and in the copending application, in order that the bar may move to the determined position for locking a particular character on the type bar and register wheel in functional positions, there must be an increment movement of the bar relative to the type member posts. This increment is provided for by spacing the posts equal distances apart and spacing the stops 34 on the selecting bar a uniform distance slightly in excess of the spacing between the individual key posts. With this arrangement, supposing the posts to be spaced seven-eighth of an inch apart and the stops one inch, it is apparent that if the first stop on the selecting bar is normally one-forth of an inch back of the first post, the second stop will be three-eighths of an inch back of the second post, and that a like progression is present throughout the length of bar. When the type bar and the register wheel are so arranged that one-eighth of an inch of movement will throw the bar and wheel from one position to the next, it is apparent that the increment in the selecting bar is sufficient to properly space the bar and wheel for a character represented by a like character on a relative key member. With this inclined, stepped arrangement of the bar and key posts, should it be necessary for one of the rear bar stops to pass beneath an inactive key post to reach its active post stop, the inactive post step beneath which the bar must travel will not interfere with such travel.

Each selecting bar has an initial cipher movement independent of the key post setting and as the progressive movements of the bar must have an increment of movement proportionate to the space between the type members, the first key post must be spaced from its selecting bar stop a distance equal to twice the distance of movement to the cipher stop, so that when the first key post is lowered and the bar moved, the bar carries the printing mechanism past the cipher position and until the figure 1 is in printing position. As the figures on the type mechanism and register wheels are spaced equally, the selecting bars must move a relatively greater distance for each higher number, or for a constant increment having the cipher movement as a base.

Safety locks.

In order to avoid confusion from accidental depression of a key post after a number has been set up in the machine, I provide each key bank with a safety lock for preventing depression of any machine keys until the operation for which the machine is set has been completed.

This safety lock is shown to constitute a wing strip 45 (Figs. 2, 7, 9, 12 and 13) located between the upper and lower flanges of the channel-shaped frame 5. The strip 45 is provided with a plurality of inwardly and downwardly extending feet 46 which are hooked through openings 47 in the flange 7, and which, in common with all complementary strips 45, is normally held out of engagement with downwardly facing shoulders 48 on the key posts 10.

The safety lock strips 45 are yieldingly urged to operative position (Fig. 13) by springs 49 (Figs. 7 and 9) that are connected with hooks 50 on the strips and hooks 51 on the upper frame flanges 6, so that unless restrained the strips would pivot on their foot mountings to project their upper edges beneath the shoulders 48 on the key posts. The strips are, however, normally restrained by a bar 52 which extends transversely across the strips of all key banks and seats in notches 53 in the upper edges thereof. The restraining bar has a lug 54 adjacent each strip 45, engaging the side of a corresponding strip to hold the strips against the tension of their springs. The restraining bar extends through slots 55 in the frame members 3—4, and slots 56 in the selecting bar frames 5, and has a head 57 adjacent the slot 55 in the side frame 4. Head 57 projects over an actuating bar 59 operated from the crank shaft, as will presently be described. The actuating bar 59 is bent beneath the restraining bar to form a cam 60 which is adapted to normally engage a pin 61 on the bar 52 to oppose the tendency of the springs 49 to move the bar from right to left. When the cam 60 is moved away from the pin 61, the bar 52 is drawn toward the left by the spring 49, and all of the safety lock strips 45 are moved under the shoulders 48 of all of the keys in the respective banks which have not been depressed, thereby locking the posts against accidental operation.

The shoulders 48 on the key posts are of sufficient length to provide substantial engagement with the upper edges of the safety wing strips 45 when in normal position, and in order to avoid obstruction of the strips by shoulders 48 of depressed key posts, I provide the strips opposite the key posts with apertures 63 through which the shoulders on depressed key posts may extend when the safety wing strips are moved to locking position. Mechanism for operating the actuating bar 59 will presently be described.

Another locking element co-operating with the selecting bars 33 is that for retaining the bars against forward movement under tension of their springs when the machine is cleared after taking a total, as presently described. Structurally, this lock comprises an arm 65 (Figs. 8 and 10) on each selecting bar 33. Each arm 65 is preferably formed as part of the head 40 that retains the selecting bar to its frame, and projects downwardly from said head along the outer face of the frame 5. Each arm 65 is provided at its lower end with an outstanding pin 66 adapted to be engaged by any of the shoulders 67 on a corresponding type sector arm, as will be explained hereafter. On the head 40, which is integral with the depending arm 65, is a pawl or tooth 68, adapted to engage one of a plurality of teeth 69 on the limit lever 70 which is pivoted at 70' to the key frame and has a rectangular slot 72 engaged by a cam shaft 73 which may be operated to raise and lower the toothed end of the lever 70 to determine when a tooth of the limit lever will engage the pawl 68. The purpose of the limit levers 70 and their cooperating mechanisms is to retain selecting bars 33 after they have been released by the wing latches when a total is taken to hold the parts in position for printing the selected numbers and to prevent jarring of the machine that would be likely to occur if all seven of the selecting bars 33 shot forwardly as the machine cleared, as hereinafter described.

Register.

The register wheels are located at about the center of the machine, directly over the rear ends of the selecting bars, from which they are operated through the mechanism which I will now describe.

Slidably mounted upon the rear end of each selecting bar 33 is a register-wheel-gear-engaging rack 71 (Figs. 2, 6, 7 and 15, and 17) which is urged rearwardly along the bar by the spring 71' connected with a hook 33' on the selecting bar and with a hook 74 on the rack in a manner similar to that described in Patent No. 1,285,156, and in the co-pending application above referred to.

To slidably mount the racks on the selecting bars, I provide each bar with an outstanding neck 75 having a head 76, projectable through enlargement 77 of a slot 78 in the rack, so that the rack may slide on the bar in the same manner as the selecting bar slides on its frame. Each selecting bar has a button 33² thereon for limiting forward movement of the rack 71 after the rack has been placed, to prevent registration of the head 76 with the slot enlargement 77 and possible displacement of the rack. The button may be located before the rack is installed and the rack sprung to permit its installation. Each rack 71 is adapted to mesh with the pinion 80 of a register wheel 81 individual to that particular rack, when the register is shifted to operative position, as presently described.

The transfer from a wheel on the right to a next higher unit wheel on the left, and the positioning of the wheels for total taking, is effected by the following mechanism:

Transfer.

Projecting laterally from the left hand face of each register wheel 81 is a pin 82 (Figs. 8, 15, 16 and 17) adapted to engage a latch 83 pivoted upon a shaft 84 running entirely across the machine, the pin engaging the stop portion 85 of the latch to stop the register wheel in position for taking a total when the register wheels are operated from the rack upon initial forward movement of the selecting bar, as will presently be described, and engaging the cam face 86 of the latch when the wheel is operated upon final return movement of the selecting bar for accumulation, providing the wheel is moved past the "9" mark. The cam engagement occurs as the register wheel completes a revolution and serves to release the register wheel of a next higher unit to provide a single step advance or transfer to such next higher wheel.

Each latch 83 is connected by a spring 90, with a bell crank lever 88, pivoted on a shaft 89 that is carried by the side frames 3—4 and extends through the selecting bar frames 5, and the upward movement of the latch is limited by a rod 90' on the frame 5, the bell crank lever assisting to effect the transfer, as presently described.

Each latch 83 has a forwardly directed lip 91, the end of which is normally engaged by the arm 92 on the rack of a next higher selecting bar to hold said rack against the tension of its spring 71'. The lip 91 is spaced from the body of the latch to form the recess 93, having a depth corresponding to a step advance of the wheel, so that when a latch 83 is rocked by the pin 82 of its register wheel, the recess 93 is presented to the arm 92 of the next higher selecting bar rack, which, urged by its spring will pass into said recess and permit the rack to which said arm is attached, to move a corresponding distance, thereby turning said higher register wheel one step to complete the transfer. The end of the lip 91 is bevelled so that when the latch is pivoted with the shaft 84 as its center, the face of the lip will move smoothly over the arm 92 and avoid the camming action and resultant drag that would occur were the end of the lip right-angular. As there is no latch 83 for the rack of the last selecting bar to the right of the machine, I provide a pin 91' on the frame head 9 for stopping this rack.

One arm 94 of the bell crank lever 88 has an ear 95 normally lying adjacent an ear 96 on the latch 83 and the other arm 97, is spaced above the spacing hub 98' on the high side of an adjacent register wheel. With this arrangement, when the latch 83 is lowered to permit a transfer, the spring 90 rocks the ear 95 on arm 94 over the ear 96, on latch 83, to lock the latch in transfer position during that operation. While the wheels are being elevated by the cam mechanism hereinafter described to restore the register the hub 98' engages the other arm of the bell crank lever and rocks the same to free the latch; the arm 92 of the next lower rack being moved out of the recess 93 upon movement of the selecting bar to cipher position or further upon a succeeding operation of the machine; the transfer taking place during one operation of the machine but clearance of the transfer mechanism so that another transfer may be made being deferred until the next succeeding operation of the machine. The numbers on the wheels 81 are visible through windows 100 in the casing 101 (Figs. 1, 2 and 3) which may be of an appropriate construction and fits over the mechanism carried by the base 1 and side bars 3 and 4.

The mechanism for raising and lowering the register to effect operation of the wheels from the rack will be described following description of the main operating mechanism.

Printing mechanism.

Type sector arms 102 (Figs. 2, 3, 5, 8, 14 and 30) are pivoted on the rock shaft 103 which extends entirely across the machine. This shaft 103 I term the secondary shaft, the crank shaft, hereinafter described, being considered the primary shaft. The forward end, 104, of each type sector arm has a lower curved edge provided with the stepped shoulders 67 that overlie and are adapted to engage the lug 66 on the depending arm 65 of a corresponding selecting bar 33, and since the throw of the selecting bar 33 determines the position of the lug 66 with respect to the sector arm, the extent of the rocking movement of that particular type sector arm will depend upon the position of the lug 66, so that the upward movement of the rear end 105 of the arm will depend upon which key in the bank is depressed. Movement of each type sector arm to effect engagement of a shoulder 67 with its lug 66 and positioning of its type sector, is effected by a spring 106, one end of which is hooked onto a finger 102' depending from the axial portion of the sector arm and extending forwardly at a slight angle. The other end of each of springs 106 is hooked into a retaining groove 107' in a cross rod 107, carried by crank arms 102² fixed on the crank shaft 120, so that when the crank is moved forwardly the fingers are moved rearwardly and the springs are tensioned to lower the shouldered forward ends of the arms.

The rear end of each type sector arm has a slot 108 (Fig. 5) therein within which is located a head or stud 109 on its type sector 110, the type sector being guided in its movement under influence of the spring 106 and returning mechanism (presently described) by the transverse bars 111 and 111' (Fig. 3) that extend between the sub-frame members 113 and 114, and through guide slots 112 in the sectors. The sub-frame members 113 and 114 are mounted on cross bars 115, 116 and 117 in the main frame and form a printer housing, the type sectors being curved (Figs. 3 and 30) so that their lower ends may be housed in the available space at the rear of the machine and guided in a curved path by the bars 111 and 111' to properly position the type relative to the paper strip and platen when lifted to printing position.

The springs 106 have a constant tendency to lower the forward ends of the arms 102 and raise the type sectors, but this downward movement is normally opposed by a rod 121 that extends across the machine beneath the forward ends of all of the sector arms and serves as a detent to control vertical movement of the sector arms presently described. The rod has reduced ends revolubly mounted in upstanding ears 122 on levers 118, one at each side of the machine. The rear end of each of the levers 118 is pivotally connected with a wing 119 that is fixed on the main crank shaft 120 and the forward end of each lever has a hook 123 located beneath a cross rod 123', carried by and extending between the frame members 3 and 4 and having an anti-friction sleeve 123², located between the keeper flanges 123³ and engageable by the lever hooks 123, as presently described. Each of the ears 122 has a rearwardly directed lobe 122', to which the lower ends of a pair of springs 122² are hooked, the upper ends of the springs being hooked onto the ends of a yoke 122³, carried by a pin rod 122⁴ that is mounted on the frame plate 3—4. When the machine is idle (Fig. 3) the wing 119 is extended forwardly and the springs 122² yieldingly retain the rod 121 in supporting contact with the forward ends of the type sector arms. Under this condition the hook 123 is spaced from the rod 123', so that when the crank shaft is operated the levers 118 fulcrum on the type sector arms until the hook 123 engages the rod 123', when the fulcrum is shifted to the rod 123'. The combined strength of all of the sector arm springs 106 is sufficiently less than that of the paired lever springs 122², that the levers are held against the tension put upon springs 106 during the initial movement of the crank shaft. When the fulcrum is shifted, however, the rod 121 descends and is followed by all of the sector arms for the cipher movement and thereafter by selected sector arms to their respective positions. The levers 118 have longitudinal, as well as pivotal movement on the rod 123', because of the rotation of the wing 119, the pushing, longitudinal movement causing the inclined edge of the end of the hook to move backwardly and downwardly under the rod 123', so that during the later part of the downward movement and earlier part of return movement, the levers remain substantially horizontal during their vertical travel.

There are ten shoulders 67 on the forward end of each type sector arm 102, one shoulder for each numeral, and a cipher shoulder. The rod 121 normally holds all of the type sector arms with the cipher shoulders above the stud, a distance equal to a step of the type sector, so that upon every movement of the crank shaft all of the arms will have some movement, those for which key posts have been depressed having movement to an extent to bring the type corresponding to that represented by the depressed post to printing position, and those for which no posts have been depressed having the minimum or cipher movement that brings the ciphers on such sectors to printing position. This movement is provided in order that the type sectors may normally be retained in position for exposing the last entry in the printed record and only be projected during the actual printing period.

Each type sector carries ten type members 124, individually movable in a frame 124' on the sector, and yieldingly urged in one direction by springs 125 which bear against the frame and against shoulders 126 on the type members. One end of each type member comprises a type face 127 and the other a head 128 for engagement by a printing hammer 129, there being a separate hammer for each type sector.

Type hammers.

In Figs. 3, 25, 26, 29 and 30, I have shown the hammers 129 as loosely straddling a shaft 130, rectangular in cross section and extending between the printer housing frame members 113—114 and set edgewise, the hammers setting in the transverse slots 130' in the upper edge of the shaft and being held to the shaft by springs 131, each connected at one end to a hook 132 on a hammer, and having a hook 131' at the other end engaged under the lower edge of the shaft. The upper ends of the hammers are weighted as at 134, so that when they are thrown forward, they may strike the type with a decided impact, all of the hammers having movement on the shaft to over-throw for the printing movement, so that a stop may be interposed for the hammers that are not to print, as presently described.

Fixed in the shaft 130 is a type hammer throw arm 135 having a pin 136 adapted to move in the slot 137 in the guide arm 138 that is pivoted at 139 to the wing 140 on the crank shaft 120. Pivoted on the arm 138, at 141, is a pusher arm 142, provided with a shoulder 143 normally held in position to engage the pin 136 to set the hammer mechanism by the spring 144, one end of which is connected to a hook 145 on the arm 138 and the other to an offset head 146 on the pusher arm 142.

The throw of the hammers is effected by a spring 148 which is connected at one end with a hook 135' on the throw arm 135, and at the other to a hook 149 on the bar 115. A cam 150, rotatable on a bearing portion 115' of the bar 115 near the bottom of the machine and adjacent the crank shaft, has a face 151 adapted to be engaged by studs 152 and 153 on the head 146' of the pusher arm 142 and has a pocket 154 adapted to seat the stud 153, as presently described.

When the crank shaft 120 is moved in an anti-clockwise direction to draw the shaft 121 rearwardly and downwardly so that the type sectors may be moved into their proper positions to be struck by the hammers, the wing 140 will have a rearward and upward swing that moves the pusher arm 142 upwardly (starting from the position shown in Fig. 25) to cause the shoulder 143 on the pusher arm to engage the pin 136 and rock the shaft 130, until the hammers assume the position shown in Fig. 26. As the operating handle on the main shaft 120 reaches the forward limit of its stroke, the shoulder 143 will have engaged and moved the pin 136 to its uppermost position (Fig. 26) so that the spring 148 will be considerably expanded. During the forward movement of the crank shaft the studs 153 and 152 successively engage the head of the cam 150, and as the shaft reaches the limit of its stroke, the stud 153 rests in the pocket 154, the cam 150 yielding against the spring 150' to permit it to conform to movement of the studs and the sliding anchorage of the guide 138 on the pin 136 insuring longitudinal movement of the guide and pusher arm and rotation of the hammer shaft.

The spring 150' preferably comprises a body portion that lies over and is adapted to slide on the rear cross bar 116, and a head 150² that encircles the hub of the cam and has a finger 150³ seated in a recess 150⁴ in the rear edge of the cam.

When the crank shaft 120 has completed its forward stroke and starts back, it draws the guide 138 downwardly, thereby forcing the stud 153 into the pocket 154. Further movement of the guide 138 will cause the pusher arm 142 pivoted thereon to move counterclockwise, unseating the stud 136 on the hammer shaft arm from the shoulder 143 on the pusher arm. Spring 148 then draws the hammer shaft arm downwardly with the pin 136 travelling along the under edge of the pusher arm, and giving the hammer shaft a quick throw to throw the hammers toward the type. It is possible that when the guide is drawn downwardly the pusher arm studs 152 and 153 will be given sufficient vertical movement along their cam faces on the cam 150 to unseat pin 136 from the shoulder 143, but the cam will not be shifted far enough by the stud 152 to unseat the stud 153. In this event the cam is rotated slightly upon continued movement of the guide with both studs in engagement with the cam, until the pin 136 engages the cam 142' and rocks the pusher arm on its pivot to unseat the stud 153. The counterclockwise movement of the pusher arm 142 is limited by the stud 152 coming in contact with the cam 151, further movement of the guide 138 causing the studs 152 and 153 to co-act to move the cam 151 clockwise, effecting complete release of the stud 153 from the seat 154. Before the hammers strike the type, pins 156 on the hammer shaft engage pins 157 on the printer housing frame plates 113—114 and movement of the hammer shaft is stopped, the loose mounting of the hammers on the shaft permitting the hammers to continue their movement by pivoting about the shaft under the momentum afforded by the weighted heads 134 and against the tension of the springs 131.

To permit the pivotal movement, and still anchor the hammer arms to the shaft 130, I provide each hammer arm with jaws 159—160 (Figs. 25, 26, 29, and 30) which seat about opposite edges of the shaft 130, the jaw 159 being curved concentrically with the opposite edge of the shaft, which acts as a fulcrum for its pivotal movement; and the jaw 160 having a hooked end 161 that takes into the socket 162 in the shaft to hold the arm against excessive movement on the shaft. After the impact of the hammer heads with the type, the arms are drawn back to normal position by the springs 131. The type members strike against an inked ribbon, which, with a record strip, is interposed between the type and the platen to effect printing, as presently described.

I have provided means for preventing certain of the hammers from contacting with the type, for example, if a number less than seven figures is to be printed upon the strip and all of the type hammers were simultaneously released, all those to the left of the number would print ciphers, i. e., if the number "499" was to be written upon the record strip, the record would appear thus: "0,000,499", unless some means be provided for preventing the four ciphers to the left from printing. In order to avoid this objection, I have provided a type hammer retarding slide, which will obstruct the complete throw—that is, the complete impact movement of those hammers which are not intended to print at any particular operation. The construction for accomplishing this is best shown in Figs. 25 to 30, as consisting of a transverse bar 164 slidably mounted in slots 165—166 in the printer housing frame members 113—114 and interposed between the type sectors and the bank of hammers, the slide bar being provided with a stop lug 167 adapted to engage against the side of the positioned type sector farthest to the left in any operation. Extending rearwardly from the left hand end of the transverse bar 164 is a bumper rail 168 against which the type hammer arms may contact at suitable points intermediate their heads and their seating ends.

The transverse bar 164 is actuated by a lever 170 having a bifurcated end 171 engaging a stud 172 on the slide bar, the other end of the lever being pivoted to the cross bar 115 by a pin 173 and normally urged to throw from left to right by a spring 174 that is secured to the lever and to the housing frame member 114. This tendency to throw, however, is normally opposed by a cam 175 pivotally suspended from a stud 176 on the main frame member 4 and having a notch 177 on its lower edge, in which the upper edge of an elbow projection 178 of the lever 170, seats to normally hold the lever 170 against the tension of the spring 174. The cam 175 is connected with a link 180 by pin and slot 181—182, on the cam 175 and in the link 180 respectively. The link 180 is pivotally connected at its forward end with a wing 183 on the main crank shaft 120, so that when the main crank shaft is rocked forwardly, the link 180 will draw the cam 175 out of the path of the elbow projection 178, so that the spring 174 may draw the lever 170 toward the right. The pin and slot connection of the cam 175 and link 180 delays the release of the lever until the type sectors are positioned, owing to the fact that the rod 121 permits operation of the type sector arms immediately upon operation of the crank shaft, whereas the cam 175 is not operated until the crank shaft has had an initial idle movement relative to the cam, i. e., until the end of the slot 182 has engaged the pin 181.

*Clearout.*

In Figs. 2, 3, 6, 7, 22 and 24, I have shown means for clearing the mechanism, i. e., releasing the key posts from their wing latches to effect restoration of functional parts to normal position when an operation is completed or in case of error.

When the keys are depressed, as heretofore explained, they are engaged by the wing latches 19 to hold them depressed. Each of the wing latches has a depending finger 184 at its forward end. Extending transversely across the machine and slidably mounted in the side frame members 3—4 is a trip bar 185, having ears 186 engageable with the latch fingers 184, so that if the bar is moved from left to right the ears 186 will engage the fingers 184 and swing all of the latch wings 19 from left to right and thereby release any key posts 10 with which the wings are engaged. The shifting of the bar 185 is accomplished by engagement of a lug 187 on the bar 185 by the edge 188 of a cam 189 that is pivotally suspended from cross rod 28, and connected with a link rod 190, having one end connected to said cam and the other to a stud 191 that is slidably mounted in a downwardly and rearwardly inclined slot 192 in a web 193 forming part of the frame plate 4, and having a head 194 for retaining it to the plate, so that when the stud is actuated, the link rod is moved to shift the bar 185.

Also pivotally mounted on the stud 191 is an actuator 195, in the form of a hook, having a forwardly extending arm 196 and a rearwardly extending arm 197, the latter provided with a hooked end 198 which is adapted to be engaged by a pin 199 on the arm 183, carried by the crank shaft 120. When the crank shaft is turned anti-clockwise—that is, when the crank is drawn toward the front of the machine, the pin 199 will ride under the hooked portion 198 of the actuator 195 to seat therein, so that when the crank is released and the shaft 120 turned clockwise, the hook will be picked up by the pin 199 and thereby draw the stud 191 rearwardly and downwardly in the inclined slot 192, so as to impart movement through the link rod 190 to the cam 189 and thereby impart longitudinal movement to the bar 185 transversely of the machine, to swing all of the wing latches out of engagement with the key posts, the stud 191 being lowered against the tension of a spring 201, having one end connected with a pin 201' on the actuator arm 196, and the other with a pin 202 on the side frame 4.

When the bar 185 is shifted by the crank shaft, as described, all of the wings are moved to the right and the key posts permitted to return under tension of their individual springs.

As the crank shaft returns, clockwise, to original position, the hook 198, resting on a pin 199' that projects inwardly from the frame plate 4, is gradually unseated from the pin 199 on the arm 183, so that as the arm resumes its normal position the hook is released, and the spring 201 and wing latch springs 24 return all of the latch parts, and the actuator to normal position, ready for a new operation.

Attention is called to the fact that the wing release does not take place until the printing and registering operations have been completed, thereby avoiding any possibility of premature release of the key posts, and further that the release of the wing latches must take place during the latter part of each operation, in order that the latches may be free to operate immediately upon commencement of the next operation. This is particularly essential, owing to the fact that the key posts are depressed as the first step of each machine operation and the wing latches must be free to latch the posts.

*Error correction.*

If an error has been made in setting up a number in the machine, it may be corrected by clearing the keyboard from an error key without operating the crank. The error key, 203 (Figs. 6 and 22) is mounted on a post 204, slidable in guides 205—206 on the frame member 4 and having an enlarged central portion 207 forming a shoulder 208, the lower portion of the post constituting a shank 209, carrying a spring 210 which seats on the lower guide 206 and bears against the shoulder 208 to normally, yieldingly support the key post in idle position.

In the rear edge of the enlarged portion 207 is a V-notch 212 forming a cam face for bearing against a pin 213 on the link rod 190, to shift the rod when the key post is depressed, the pin normally resting in the base of the notch so that the link rod is actuated to shift the wing latches upon downward movement of the post.

Fixed on the crank shaft 389, which operates the main shaft 120, as presently described, is a mutilated segment 214 (Figs. 4 and 38) having a pin 216 projected into a segmental slot 215 in the side frame 3 to limit the throw of the segment.

The periphery of the segment has teeth 218 for engagement by a pawl 219 to prevent return throw of the segment until the crank has been moved forwardly to its fullest extent. Reverse movement may be imparted to the segment and shaft 120, however, after a partial forward stroke of the crank, provided the distance travelled is not sufficient to enable the pawl to engage one of the teeth. The partial swing of the crank will be sufficient to enable the pin 199 (Fig. 22) to engage under the hook 198, so that when the crank returns, the cam 189 will be actuated to clear the keyboard, so that all of the keys in all of the banks which are locked may be instantly released by a single partial forward and reverse stroke of the operating crank, without affecting operation of the register or printing mechanism.

*The register.*

Referring now to the mechanism whereby the register wheels are shifted to position for operation by the selecting bars to accumulate, and for taking totals and subtotals, but first to the operation for accumulation:

*Accumulation.*

It has heretofore been stated that the selecting bars 33 are yieldingly urged forwardly by the springs 35. This tendency is, however, restrained by arms 220 (Figs. 2, 3, 4, 5, 8 and 30) fixed on the secondary shaft 103 and which engage the pins 37 on the selecting bars to normally hold the bars to the rearward limit of their travel. At each operation of the crank shaft, anti-clockwise movement of the shaft effects a downward and rearward movement of the wing 120' on the shaft. This wing is connected with a link $120^2$ that connects at its outer end with a wing 103' on the secondary shaft 103, rocking the secondary shaft 103 and moving the restraining arms 220 forwardly to permit the selecting bars to move forwardly until stopped by previously positioned key posts on the several banks. This forward movement of the selecting bars is idle, however, with respect to the register wheels, as the wheels are not brought down into operative connection with the racks on the selecting bars until the bars have completed their forward movement.

The register wheels are lowered to operative position upon final forward movement of the crank shaft by engagement of the pin 279 (Figs. 6, 18, 19 and 20) on arm 183 against the depending arm 221 fixed on a shaft 222 that is revoluble in frame members 3—4, rocking the shaft and moving the cam arms 223 rearwardly. The cam arms 223 are fixed at opposite ends of the shaft 222 and have heads 224 at their upper, free ends, provided with forwardly and downwardly inclined slots 225 containing the ends of the register wheel shaft 98, so that when the crank is moved forwardly the cam arms are moved rearwardly and the upper, inclined edges of the slots 225, pushing on the register wheel shaft, lower the shaft and move the pinions 80 into mesh with the racks 71 on the rear ends of the selecting bars.

Integral with the arm 221 is an arm 226 and pivoted to the arm 226 is a link 227, having a stud 228 (Fig. 18) located in an offset slot 229 in a plate 230 that is suspended from the top of the case. Attached to the stud 228 and to a pin 231 on plate 230 is a spring 232 which tensions the link forwardly and upwardly, so that when the link is moved rearwardly, as the register shaft is lowered, the stud is drawn into the upper portion 233 of the slot and held to the rear wall thereof to lock the link and retain the register shaft until the accumulating operation is completed. As the crank shaft 120 approaches the rearward or return limit of its movement, a stud 235 on the arm 236 on the crank shaft engages the forward edge of the lower arm of a lever 237 that is pivoted on a stud 238 on the main frame member 4, rocking the lower portion of said lever backwardly and the upper portion forwardly. Lever 237 has a rearwardly directed ear 239 on its upper end provided with a stud 240, adapted to engage the upper edge of the link 227, so that forward movement of the lever 237 causes the stud to engage and rock the link 227 on its pivot. This lowers the link stud 228 out of locking position in the slot 229 and the spring 232 thereupon draws the link back into the horizontal part of the slot so that a spring 243, (Fig. 6) connected with one of the cam arms 223 and with a pin 244 on the frame plate 3, may rock the cam arms and lift the register wheel pinions from their racks. It is apparent that the spring 243 also serves to normally retain the cam arms forwardly and the register shaft elevated out of contact with the selecting bar racks. When the register wheel pinions 80 are raised with the shaft 98, each meshes with a tooth 80' on the frame 5 to lock the pinion and prevent accidental displacement of the register wheel, the pinions starting to mesh with the teeth 80' before leaving engagement with the racks 71, and vice versa, thereby insuring against any displacement of the pinions during the shift in either direction.

*Repeat.*

It is often desirable to repeat an entry on the record. Ordinarily, this would require repetition of the setting operation, owing to the fact that the keyboard clears automatically with each complete movement of the crank shaft. With the following mechanism, however, a number, when once set, may be held for as many entries as desired. 245 (Figs. 6, 22, and 23) designates a repeat key having a post 246 slidably mounted in slots in brackets 249—249' on frame plate 4, the lower end of the post being reduced to form a shank 250 and shoulder 251. Surrounding the shank 250 and bearing against the bracket 249 and shoulder 251 is a spring 252 which normally, yieldingly urges the post upwardly, the post having a stop shoulder 253 for engaging the bracket 249 to limit its upward projection. The key-post 246 has a notch 254 at its upper end, forming a shoulder 255 adapted to engage the edge of the slot in the case when the post is depressed and given a slight forward motion to lock the post in a depressed position. The post carries a pin 256 adapted to engage the arm 196 of the key release actuator 195, to lift the hooked end 198 out of position for engaging the pin 199 on the crank shaft arm 183, when the repeat operation is to take place; thus preventing engagement of the pin 199 with the hook, that would otherwise tend to draw the rod 190 and operate the wing latch release cam. The crank shaft may therefore be operated idly in so far as the key-posts are concerned and the selecting bars given the same movement upon repeated movements of the crank. The repeat key is cleared automatically upon clearance of the machine from the error key or total-sub-total key through a pin 190' on the link rod 190, which engages the forward edge of the repeat key and unseats the shoulder 255 when the link rod 190 is moved backwardly by the error key, as heretofore described, or by the total, sub-total key, as will presently be described.

*Total and sub-total taking.*

The taking of totals and sub-totals is effected through a total, sub-total key 258 (Figs. 6 and 18 to 23 inclusive) on a post 259 that is guided in a slot 260 in a flange 230' of the plate 230, and on a pin 262 that projects from the frame plate 4 into a slot 263 in the lower end of the post. The post 259 comprises an enlarged body portion 264 which is normally located in the slot 260 and forms front and rear shoulders 265—266, adapted for engagement with the front or rear edges of the slot 260 when the post is depressed and moved forwardly when a total is to be taken or rearwardly when a sub-total is to be taken (Figs. 19 and 20). The post is normally, yieldingly supported in idle position by a spring 267 connected with its lower end and with the plate 230, the pin 262 serving as a stop to limit its upward projection. Extending from the face of the total, sub-total key is a stud 268 which is adapted to bear against a head 269 of the link, 227, so that downward movement of the total, sub-total key-post pushes the front end of link 227 downwardly, causing the stud 228 (Fig. 18) to travel in the downwardly and rearwardly inclined portion of the slot 229. This movement causes the link 227 to move the arm 226 backwardly, i. e., clockwise, rocking the shaft 222 and lowering the register wheel shaft 98, causing the register wheels to mesh with their racks. As movement of the total, sub-total key is effected prior to operation of the crank, the register wheels will be moved upon primary or forward movement of the selecting bars, movement of the wheels and racks being interrupted at the proper point by engagement of pins 82 on the wheels with the top portion 85 of the latches 83 (Fig. 163). The pins 82 are so located on the wheels that when they are stopped by the latches, ciphers will show through the windows, and the lugs 66 on the selecting bars be in position to engage shoulder 67 on the type sector arms (Fig. 8) corresponding to the numbers showing on the register wheels before the total taking began, i. e., if one of the register wheels is at 9, the wheel will make $\frac{1}{10}$ of a revolution and the corresponding selecting bar will be moved backwardly a proportionate distance, so that the type sector arm will not be stopped in its setting movement until the 9 type on the sector for that unit is in printing position.

Total taking.

The only difference between the taking of a total and a sub-total is that for a total the register wheels are released as soon as the total is printed and fly back to normal position with all wheels at ciphers, ready to start a new accumulation; while for a sub-total the wheels are held in mesh with the racks during return movement of the selecting bars so that the wheels are returned to their former position and the accumulation, interrupted for the taking of the sub-total may be resumed. Mechanism is, therefore, provided for effecting return of the register wheels at the proper time.

Located just below the top of the case is an arm 270, the rear end of which has a slot 271, within which is slidably mounted a pin 272 on the lever 237 and near the front of which are two lugs 273—274, between which the post 259 and the enlarged portion 264 thereof may pass, but which are adapted for engagement respectively by the lower shoulders 275—276 formed by said enlarged portion, under conditions presently described. The arm 270 is yieldingly urged forwardly by a spring 277 connected with the arm and with a pin 278 on the frame member 4, so that the pin 272 engages the forward end of the slot 271 and the rear lug 274 is in position to be engaged by the rear, lower shoulder 276 of the total key-post.

To take either a total or sub-total, the post 259 is pushed downwardly, thereby lowering the register wheel shaft to cause the wheel pinions to mesh with the selecting bar racks as described.

If a total is to be taken, the post 259 is moved forwardly when depressed, locating its front upper shoulder 265 under the top of the bracket 261, which holds the post lowered against the tension of the returning spring 267. With the posts so positioned, the wheels are so positioned prior to forward movement of the selecting bars. When the post 259 is moved downwardly, its lower rear shoulder 276 engages the lug 274 on arm 270 and lowers the arm on its pivotal mounting on pin 272, and when the post is shifted forwardly to seat the shoulder 265 under the plate 230, there is no corresponding movement of the arm 270, the latter being held by engagement of the forward end of the slot 271 with the pin 272. This forward movement of the post moves the shoulder 276 of the enlarged portion 264 off of the lug 274 and frees the arm 270 so that its spring 277 lifts the arm along the post to the position shown in Fig. 19. With the parts in this position, when the crank approaches the forward limit of its movement, the pin 199 on the arm 183 engages the lower arm of lever 237 and rocks the lever. The pin 272 being at the front of the slot 271, immediately draws the arm rearwardly, the lug 273 engaging the enlarged portion of the post 259 and moving said post rearwardly until the shoulder 265 has, unseated from the bracket 261 and is drawn upwardly by its restoring spring. Return of the post 259 releases the link 227 and permits the cam arms 223 to return to normal position, lifting the register wheels before the crank starts on its return movement, thereby permitting all of the register wheels to return to rest in cipher position ready for fresh accumulation. The type sectors are retained in their total taking position, however, by the springs 106 on the sector arms 102 until after the total is printed, and the selecting bars are held against forward jump movement under tension of their springs by the limit levers 70, which have been set by the cam 73. When the total has been printed the type sectors are returned by the rod 121 and the selecting bars by the arms 220.

Sub-total.

When it is desired to take a sub-total, the post 259 is pushed downwardly and to the rear (Fig. 20). This positions the link 227 and lowers the register wheel shaft as for the total taking, but the arm 270 is retained in lowered position because the spring 277 holds the arm forwardly with the lug 274 under the post shoulder 276 and the pin 272 at the front end of the slot 271. With the parts so arranged, when the crank is moved forwardly, the stud 199 on the side of the crank shaft arm 183 engages the lever arm 237 at the forward end of the crank stroke and moves the lever forwardly as before, pulling the arm 270 rearwardly and freeing the lug 274 from the key-post shoulder. The front end of the arm 270 is then moved up by the spring 277 until the lugs 273—274 embrace the enlarged part 264 of the post 259, the post, however, being held down by its engagement with the bracket 261 and the register remaining in mesh with the selecting bar racks, the idle movement of the slotted part of the arm 270 over the pin 272 permitting this movement of the arm 270 relative to lever 237. Rearward movement of the crank then effects the printing of the same figures as would have been printed for a total, the register being retained, however, in its lowered position by the link 227, which is held by the key-post 259, so that the register wheels remain in mesh with the racks, and are returned to the positions from which they were backed for the sub-total taking. As the crank approaches its rearward limit, the stud 235 engages the lever arm 237 and rocks the lever, moving the pin 272 through the slot 271 to engagement with front wall of the slot and then pushing the arm 270, causing the lug 274 to push the key-post free of the plate 230. The spring 267 then restores the post 259 and frees the cam arms 223, so that they return, under tension of the spring 243 and restore the register to the condition in which it was before the sub-total taking operation started.

Safety lock operation.

The safety lock strips 45 for the several banks of posts in the keyboard are, as previously described, normally urged to functional position by their individual springs 49, but restrained by the single bar 52 (Figs. 12 and 13) which extends across all of the locks and is held in restraining position by the cam 60 on bar 59. The bar 59 has a pin 59' thereon slidable in a slot 4' in the frame member 4. Connected with said bar 59 and with a hook 59² on the frame member 4 is a spring 59³ which urges the bar 59 rearwardly to unseat the cam 60 from the pin 61 on the lock bar, and free the lock bar and safety lock plates. This action of the spring is resisted by a stud 280 on the lever 237 which engages the end of the bar 59 and holds the bar forward against the tension of its spring, the lever 237 being held in advanced position while the machine is idle by engagement of the stud 235 on the crank shaft arm 236 with the lower arm of the lever. It is apparent, therefore, that upon initial forward movement of the crank, the stud 235 is moved away from lever 237, permitting the spring 59³ to move the bar 59 back to free the lock bar 52, which in turn frees all the safety lock plates so that they move to position under tension of their springs and hold the key-posts against accidental depression during the complete movement of the register and printing mechanisms for entering a number or taking a total or sub-total.

It is further apparent that the slight movement imparted to lever 237 by the lock bar 59 does not effect the operation of the parts connected with said lever, as the movement, while sufficient to properly shift the lock bar, is only sufficient to move the pin 272 from front to rear of slot 271 in arm 270 and does not disturb co-operative relation of the stud 240 with the link bar 227, there being normally sufficient space between the stud 240 and link bar 227 to permit the safety lock shift without operating the link bar.

Selecting bar retarder.

I have heretofore referred to mechanism for preventing premature release of the selecting bars when said bars have been permitted to move forward to positions determined by functioned key-posts, by removal of the selecting bar arms 220 from holding relation with the selecting bars upon operation of the crank.

In the ordinary operation of entering and printing a number the retarder is non-essential, as the keyboard is not cleared to free the posts until the return movement of the crank has carried the arms 220 to "pick up" the bars. When taking a total, however, no keyboard posts are down—movement of the selecting bars being determined by the register wheels, which have been moved into mesh with the selecting bar racks immediately upon forward movement of the crank. Under such conditions, the selecting bars are stopped and held by the register wheels, while the arms 220 move forward to their limits. As the register wheels are restored at the end of the forward movement of the crank—in total taking—they free the selecting bars which would, without the retarder, jump forward under their spring tension, and possibly cause damage by their impact against the arms 220.

With the present construction, when the crank moves forwardly, it rocks the notched segment 214, as previously described. Pivotally mounted on the pin 216, which guides and limits travel of the segment, is a lever 281 (Figs. 38 and 14), one arm 282 of which is connected by a stud 283, with the wing 119 on the secondary shaft to operate the secondary shaft with the crank shaft. The other arm 282' of the lever 281 extends along a link 284, having a horizontally slotted head 284' at one end guided on a stud 284² that projects inwardly from the frame member 4 and has a keeper washer 284³ for retaining the link in position. Near its opposite end, the link has an overhanging finger 284⁴, forming a rearwardly opening slot 284⁵ within which a guide stud 284⁶ carried by the frame 4 is located, a friction washer 284⁷ being interposed between the frame and the link to yieldingly press the link against the head of the stud and avoid lost motion between the parts. In the rear end of the link is an upwardly opening pocket 284⁸ seating a stud 284⁹ on a wing 284¹⁰ on the shaft 73 controlling the selecting bar detents.

On the lever arm 282² is a laterally directed stud 282³ which is adapted to work between shoulders 284¹¹—284¹² on the link 284, to set and return the detents upon forward and back movement of the crank shaft.

The detent shaft 73 has a half-round portion 286 located in slot 72 in the limit lever 70, heretofore mentioned, and the movement imparted from the crank shaft is sufficient to make a quarter turn of the shaft 73. The diameter of the shaft is equal to the depth of the slot 72 so that ordinarily the tooth bar is supported in non-functional position, but the turn of the shaft provides space in the opening and the tooth bar is drawn down by spring 24, so that a tooth 69 thereon engages the tooth 68 on the selecting bar and holds the bar against forward movement. With this construction, when the selecting bars have been positioned and the other parts set upon forward movement of the crank, the lever stud 282³ engages the forward link shoulder 284¹² and sets the detents. Upon return of the crank the stud engages the other shoulder 284¹¹ and returns the detents, so that the selecting bars may move freely at the next operation of the machine.

*Crank shaft return.*

I prefer to make return movement of the crank shaft automatic so that the crank may be released after it has reached its forward limit and will then return without effort on the part of the operator, principally by the type sector arm springs 106 and lever springs 122², but with the assistance of a spring 295 (Figs. 2, 3, 4, and 30), one end of which is hooked onto the rod 121 connecting the type sector control levers 118 and the other onto the rod 107 carried by the crank shaft arms 102². With this arrangement of springs, I not only effect automatic return of the parts, after the crank has been pulled forwardly by hand, but I also tend to balance the tensions of the springs so that pull on the crank is substantially constant but slightly relieved at the forward limit of the stroke. The relative values of the springs 106 and 122² are such that, when under operative tension, each spring 106 will throw its type sector to position, but the combined strength of all of the springs 106 will not overcome the springs 122². The object in providing the spring 295 is to assist the relatively weak springs 106 in completing the return of the crank shaft.

When the crank starts forwardly the springs 106 are immediately put under tension, because, while the crank shaft is moving back the type sector arms are held by the lever springs 122². The spring 295, having the same rear mounting as the springs 106, is put under tension with them. The tension in springs 106 and 295 increases until the fulcrum of levers 118 is shifted from rod 121 to rod 123', when the levers are moved downwardly, tensioning the springs 122². As the type sector arms follow the rod 121, there is no gain in tension of the springs 106 during this latter crank movement, the tension of springs 106 being maintained and that of springs 295 being but slightly increased as the crank approaches the limit of its forward movement (Fig. 30) the wing 119 assumes a substantially perpendicular position and the flat ends of the lever hooks 123 move into contact with the rod 123' and the levers move in substantially a horizontal plane. Prior to this final movement of the crank, the sector teeth 67 have engaged their respective selecting bar studs 66, stopping the following travel and placing tension on the individual springs 106 proportionate to the stopping points of corresponding type sector arms. The final movement of the crank (⅛ of an inch is sufficient), occurring after the levers 118 have been lowered sufficiently to permit the last notches of the type sector arms to engage their studs 66, is idle relative to the type sector arms, and is for seating the stud 153 of the pusher arm head 146' in its pocket 154 in the end of the cam 150. This horizontal movement of the levers avoids excess and unnecessary tension on the springs 122² that would be imparted to them by a further cam travel of the hook 123 along the rod 123'.

The under edges of the type sector arms have recesses 102³ so located that the levers 118 travel in the recesses of fully lowered type sector arms, thereby avoiding friction between the rods 121 and the sector arms, during this final forward movement of the crank shaft. Resistance from the levers 118 is due to friction between the end of the hook 123 and rod 123', rather than directly to tension of the springs 122² and the rear ends of the springs 106 are slightly wound on the secondary shaft, whereby tension on the crank is slightly relieved. The crank, having completed its forward movement, is released for automatic return. Arrangement of the springs 122² is such that they have a forward as well as upward pull on the levers 118 and their strength is sufficient to move the levers off of their dead centers and start the crank shaft on its return movement and seat the fulcrum hooks 123 on the rod 123'. This initial movement is cushioned by retensioning of the spring 295 during that period in which the pin 118' has greater horizontal movement than the pin 107. Following this retensioning movement, the springs $122^2$ lift the levers 118 and their cross rod 121 and rotate the crank shaft 120 through the connection of the levers with wings 119 on the shaft, the rod picking up the type sector arms and returning them to initial position. During this initial movement the springs 106 assist in return of the crank shaft, but the spring 295 gives up but little of its tension. After the type sector arms have come to rest, the springs 106 and 295 take up the work of returning the shaft, the final movement of which is effected wholly by the spring 295.

From the foregoing it is apparent that, while entire forward movement of the crank shaft is against spring tension, the tension is equalized by relay action of the springs 106, 295 and $122^2$, and that return of the shaft is automatic under substantially constant tension due to reverse relay action of the same springs. To avoid shock to the machine by a too rapid return of the parts, I provide a dash-pot 299 (Figs. 2 and 5) of ordinary construction, the cylinder of which is pivoted on the rounded end 115' of the cross bar 115 carried by the frame members 3—4. The dash-pot comprises a piston (not shown) having a rod 301, connected thru a yoke 302 and pin 303 with a link 304, that is connected to the wing 119 on the crank shaft, so that the piston is reciprocated by forward and backward movement of the shaft and cushions return movement of the shaft.

*Record strip control.*

The printed record is made on a strip which must, necessarily, advance between the printing operations, and is conveniently operated from the main shaft as illustrated in Figs. 2, 3, 5, and 6, and described as follows: Pivoted at one end to the piston rod 301, preferably through the pin 303 and yoke 302, and at the other to a stud 307' on the side frame 3, is a bell-crank link 307, having a bifurcated projection 308 which engages a pin 309 on a rocking link 310 of a rock shaft 311, that extends entirely across the machine and is rotatable in the frame members 113—114. Rocking links or cranks 312 are also carried by the shaft 311 and each connected by a pin with a link 315 secured to a gripper arm 316 pivoted at 315' to the swinging complementary jaw arm 317 which is pivoted at 318 to extensions 319 on the frame members 113—114. The jaw 317 is held to its pins 318 by spring keys $317^1$ and held against rattling by spring washers $317^2$ interposed between the jaw arms and the bracket extensions. Below the bracket extensions 319 is a paper roll bracket 320 comprising extensions (presently described) having downwardly and forwardly inclined slots 321 within which the ends of a paper roll shaft 322 may seat to provide free revolution of the roll and automatic adjustment of the roll against the rear of the machine case, the upper ends of the slots being provided with enlargements 323, to permit installation of the roll and removal of the empty carrying roller 324 and shaft 322. The roller 324 carries a roll of paper strip 325 which may pass substantially parallel with the back of the casing and between the platen 326 and tension rollers 327 and between the gripper jaws 328 and 329 carried by the arms 316 and 317 respectively. The rollers 327 are fixed on a shaft 327' (Fig. 5) slidably mounted in the slots 330 in extensions 331 on the frame members 113—114. Connected with each end of the shaft is a spring 332 that is attached to the bracket and yieldingly urges the rollers against the strip to hold the same on the platen. With this arrangement, when the crank shaft is moved anti-clockwise, the link 304 will cause the piston rod 301 to raise the piston in the dash-pot 299 and, through the medium of the link 307, link 310 and links 312 and 315 will exert a pull against the arm 316 drawing the arm 316 forwardly against a projection $317^3$ on the gripper arm 317, movement to this point being sufficient to open the jaws 328—329, so that they may pass forwardly over the paper strip, and continued movement of the arm 316 after it has engaged this projection 317' carrying both jaws forwardly to position for gripping the paper strip at a point from which the return movement will effect a proper strip advance. When the crank is released, movement of the parts is reversed, the arm 316 being first moved back to rock the gripper jaw 328 downwardly to bind the paper strip against the under jaw 329 and both jaws then being moved back together to advance the strip. The rear edge of the upper gripper jaw serves as a cutting edge against which to draw the paper to effect its severance, and the front edge of the jaw is preferably provided with a finger slot 333' to facilitate threading the strip through the jaws.

*Ribbon feed and reverse.*

The same mechanism which advances the paper strip also serves to advance the inked ribbon step by step with operations of the machine. The ribbon feed consists of two spools 334 and 335 (Figs. 31 and 33) on which is wound a ribbon 336, preferably a multicolored ribbon, and which passes through guides 337 and 338, both carried by the yoke frame 339 pivotally mounted on a bar 340, which, in turn, is pivotally mounted on a stud 340' on one end of the transverse support 116.

The bar 340 is provided with an opening 342 adapted to be engaged by the nose 343 of a link bar 344 (Figs. 34 and 35) having a lateral stud 345 slidable in a slot 230' in the lower end of the plate 230 in which slides total key-post 259, so that when the total key is depressed a stud 264' on the total key-post pushes the stud 345 downwardly, shifting the bar 344 rearwardly to project the nose 343 at the rear end of the bar into the aperture 342 in the bar 340. The bar 344 rests on a lug 348 on the wing 183 carried by the main crank shaft 120, so that when the total key is depressed, the nose 343 of the bar 344 is projected into the aperture 342 and, when the crank is turned, the lug 348 lifts the bar 344 and raises the yoke frame 339 to present the red portion of the inked ribbon to the printing position, so that the totals will be shown in red, the bar 344 fulcruming on the pin 348 when raised and lowered by actuation of the wing 183. The enlaregements at the upper ends of the slots 263 in the total key-posts and 230' in plate 230 are merely to permit assembly of the studded parts, as the studs 262 and 345 register with the enlargements during operation of the machine.

In order to retain the ribbon in total taking position until the printing operation is completed, I provide locking mechanism comprising a pin 350 on bar 344 which moves vertically in a slot 351 in a locking plate 352, that is pivotally mounted on the frame plate 4. The slot 351 has an offset 353 at the tip, which forms a seat 354. The locking plate is normally urged forwardly by a spring 355 which is connected with a pin 356 on the plate and with the pin 181 on the type arm buffer cam, so that the single spring serves to urge the locking plate forwardly to effect seating of the pin 350 in the seat 354, while also urging the cam 175 rearwardly to lock the type arm buffer lever 170. When the pin 350 reaches the tip of the slot, the plate shoots forwardly and seats the pin. The ribbon frame is thus held up until the operation of the machine is completed, when the end of the link 180 butts against the pin 356 on the locking plate and returns the plate so that the pin 350 may drop back under the weight of the ribbon frame, supplemented by the tension of a spring 358, which is connected with a hook 358² on the bar 344 and with a hook 359 on the locking plate 352, and returns the black portion of the ribbon to printing position.

On the ribbon 336 near its respective ends are lugs or buttons 360 (Fig. 31) each of which may engage a corresponding pivoted lever 361 to cause a co-operating lever 362 to actuate a pivoted detent 363, (Fig. 33) against the tension of its spring 364, so that the detent will engage the pawl 365 which is urged toward the ratchet wheel 366 on the ribbon drawn by spring 367, and throw the pawl out of engagement with the ratchet. The springs 364 and 367 are connected with the detent and pawl, respectively, and with hooks (not shown) on the frame members 113' and 114'. This movement of the levers 361—362 simultaneously permits a corresponding mechanism of the other spool to move into operation and reverse the ribbon feed.

The levers 361 are bifurcated at their upper ends so that the ribbon may pass through the arms of the bifurcation to effect engagement of the ribbon button 360 with the lever. Both the lever 361 and lever 362 are pivoted on the cross bar 117, secured to and extending transversely between the frame members 3—4. The lower ends of the levers 361—362 are connected with respective members of a two-piece slide which is freely movable in the frame members 113 and 114. This slide consists of relatively wide and narrow members 370–371, the wide member having a central, cut-out portion 372 provided with oppositely extending tongues 373—374, seating a coil spring 375.

Fixed to the narrow slide 371 is a bracket 376, having slotted jaws 377—378 slidably embracing the wide slide 370 and adapted for engaging opposite ends of the spring 375, so that when the narrow slide is moved in either direction, the broad slide is tensioned likewise. Normally the broad slide is restrained by a latch that is adapted to release the slide when the lever 361 is rocked, to permit the ribbon reversing mechanism to be instantly operated, to throw the respective ribbon drum operating mechanisms into and out of operation, relative to their drums.

The levers 361 have their lower ends pivoted to the ends of the narrow slide member 371, the lower ends of the levers 362 being provided with studs 380 which seat in the notches 381 in the wide slide member 370. A bell crank latch 382 is pivoted on an arm 383 that projects inwardly from a bracket member 136 and has a slot 384 in one arm seating a stud 385 on the adjacent lever 361, the other arm having a laterally turned shoe 386 adapted for movement in front of or back of a mating shoe 386' on the end of the broad slide 370.

With this arrangement, when the button 360 comes from the spool 334 on the left of Fig. 31, it engages its lever 361 and rocks the latch 382 to locate the latch shoe in front of the shoe 386' on the end of the broad slide 370, thereby holding the broad slide against movement to the left. Movement of the narrow slide, which is also effected by movement of the lever, causes the bracket 376 to engage the right hand end of the spring 375, tensioning the spring between the jaw end and the tongue 374. Continued movement of the lever 361 carries the latch shoe 386 out of the path of the slide shoe, and when the slide is clear, it is shot to the left under tension of the spring 375. When the broad slide is moved to the left it rocks both the levers 362 to the left, releasing the left-hand detent 363 so that its spring 364 may free the forwarding pawl 365 for that ribbon spool. Thereupon the pawl 365 may operate the spool on the left to wind the ribbon thereon. Reversely, movement of the slide 370 to the left, moves the upper portion of the right hand lever 361 over to position to be engaged by the button on the right hand ribbon drum and carries the right hand lever 362 away from its detent 363 so that the forwarding pawl at that side may be drawn away from its detent. When the ribbon has been wound upon the left hand drum, the button 360 on the right rocks its lever 361, thereby running the narrow slide 371 to the right and shifting the latch 382 to hold the broad slide, tensioning the spring 375 and eventually releasing the broad slide so that the relations of the detents and forwarding pawls may be reversed. Movement of the slide to the right is also controlled by the shoes 386—386', the shoe 386 moving up back of the shoe 386' in this instance. With this arrangement, the slow movement of the levers 361 may effect quick reverse of the ribbon forwarding parts in the proper direction. The ribbon drum preferably comprises keeper springs 334' for retaining the spools (not shown) against overthrow, to avoid slack in the ribbon.

Crank.

The crank 388 for operating the machine is not mounted directly upon the main shaft 120, but upon an independent crank shaft 389, which is rotatable on the frame 4 and connected with the main shaft through the segment 214 and lever arm 282, as heretofore described, the crank being removable to facilitate shipping and storing. The crank is applied to its shaft through a hub 390 (Fig. 39) that is adapted to fit snugly, but move freely on the shaft 389, the inner end of the hub having a circumferential groove 391 in its periphery and having radial, spaced slots 392—393 intersecting the groove and opening to the hub channel. On the segment 214 is a button 394, the head of which is spaced from the segment to fit within the groove 391 in the crank and is of such width that it will pass through the hub slot 392. Pivotally mounted on the segment is a pawl 395, of such width that it will pass through the hub slot 393 and of such length that it will ride tangentially on the surface of the hub 390 when the hub is being applied to the shaft. The pawl is spring pressed to engage the hub, preferably by the spring 396, one end of which is attached to a stud 397 on the segment while the other is hooked into the edge of the pawl to press the pawl in the direction of the shaft.

When the crank is to be applied to the shaft it is in substantially a horizontal position with the handle directed forwardly, so that the recess 393 receives the button 394 and the recess 392 the pawl 395, and the hub pushed to place. The crank is then raised (clockwise), the head 394 travelling in the hub groove and the pawl dragging on the hub periphery. When the crank reaches its rearward position the pawl will drop into the recess 393, and, when the crank is drawn forward, engage the edge of the recess and effect rotation of the crank shaft with the crank. It is apparent that to remove the crank it is only necessary to move the crank on clockwise till the button and pawl register with the two hub recesses and draw the hub from the shaft.

Operation.

In describing the use and operation of the machine I will assume that it is desired to add the sums 563.25, 39.80 and 216.00. The first sum is set up in the machine by pushing downwardly on the 5, 6, 3, 2, and 5 keys successively in the five banks of keys at the right of the machine. As each key is depressed, the lower end of its post pushes against the wing latch 19, forcing the latch laterally against the tension of its spring until the notch 16 is in position for receiving the wing latch, when the latch springs back to locking position and holds the key depressed, this action being the same for the key-posts in all of the banks. When all of the key-posts for the first sum have been set, the crank handle is drawn forwardly to register and print that individual sum. The first action taking place upon forward movement of the crank shaft is the rocking of the secondary shaft levers 118, which control the type sector arms. Each type sector arm is normally tensioned downwardly by its spring, so that as soon as the cross rod 121 starts downwardly, the type sector arm follows it and continues its downward movement until stopped by the lug 66 on a respective selecting bar. As the type sector arms can only move downwardly with the rod 121, movement of the arms is delayed while the fulcrum shifts from rod 121 to rod $123^2$, but as the selecting bar control arms are fixed on the secondary shaft 103, they are moved immediately upon movement of the crank so that the lugs 66 move slightly in advance of the forward, toothed portions of the sector arms. The selecting bar studs are therefore out of the way of the type sector arms and friction is avoided in the initial cipher movements of the posts, as well as through any advance movements for which the keyboard is set. The selecting bars move forwardly under the tension of their springs, following the control arms 220 until the proper stops 34 contact corresponding depressed key-posts. When movement of the selecting bars is stopped by the key-posts, the control arms 220 and the type sector arms 102 continue their movement until the shoulders 67 on the type sector arms, corresponding to the depressed key-posts, engage the lugs 66 suspended from the selecting bars and stop the movement of the type sector arms. While the forward ends of the type sector arms are moving downwardly, their rear ends are moving upwardly, lifting the type sectors so that when the arms stop, type corresponding to the depressed keys are in printing position.

Another movement taking place upon the forward travel of the crank shaft is the tensioning of the type hammers. As the crank shaft moves anti-clockwise, the arm 138 carries the pusher arm 142 upwardly so that it engages the pin 136 on the crank arm that is fixed to the type hammer shaft and rocks the shaft to position the type hammers for striking, and tensions the spring that effects the throw. There is a slight idle movement of the pusher arm upon the initial movement of the crank shaft in order to limit the seating movement of the hammers. By the time the crank has reached its forward limit, the pusher arm will have seated on the cam member 150 so that the hammers are retained in tensioned, set position until the crank starts backwardly. Forward movement of the selecting bars is, therefore, idle in its relation to the register wheels and printing operation although the parts are set to effect register advance and printing.

As the crank shaft may and does have idle movement at its forward end relative to the selecting bars, there is a short period at the forward end of the stroke during which the selecting bars are stationary in their set positions. During this period when the selecting bars are stationary and the crank shaft continues its forward movement, the stud 279 on the arm 183 of the crank shaft engages the arm 221 to rock the cam arms 223 and lower the register wheel pinions into mesh with the racks on the selecting bars, so that when the selecting bars again move, they will carry the racks with them and advance the register wheels, the movement whereby the register seating cam is operated also serving to lock the cam in operative position through the link 227.

Forward movement of the crank shaft also carries the pin 199 along the hooked arm 197 to position it for releasing the key-posts and register cam, i. e., clear the machine, upon return movement of the crank shaft. Also, during the forward movement of the crank, the starting spring is tensioned and the dashpot piston lifted, the lifting of the piston moving the strip advancing jaws forwardly to gripping position on the paper strip. The first slight movement of the crank also releases the safety strips 45, through the lever 237, so that they move to position under the key-post shoulders and prevent accidental depression of any of the keys. The last part of the forward movement of the crank actuates the selecting bar detents 70 through the link 284 to hold the selecting bars in whatever position they are found, and prevent their displacement until picked up on backward movement of the crank.

Return movement of the crank causes the rod 121 to engage the type sector arms and lift the arms against the tension of the springs 106. There is, however, as before stated, a slight idle movement of the crank shaft at the forward end of the stroke and during this idle movement the pusher arm 142, which operates immediately as soon as the crank shaft starts back, causes the pusher arm to rock on its pivot, releasing pin 136, freeing the hammers 129, so that they may be thrown forwardly and strike the positioned type, causing the type to impress a record strip through the inked ribbon and thereby print the number set up in the machine. Engagement of the pin 136 with the cam 142' on the pusher arm from the pocket 154 in cam 150, permits continued movement of the crank shaft.

The operation of the mechanism for preventing printing of the ciphers to the left of the first digit in the number will be described later in order to avoid confusion of the description of the operation of the main parts of the machine.

After the printing has been effected, continued movement of the crank shaft causes the control arms 220 to again engage the pins 37 on the selecting bars and move the selecting bars back to their original positions. This backward movement of the selecting bars causes the racks on their rear ends to turn the register wheels distances proportional to the initial movement of the selecting bars; that is, for the figure 5, the selecting bar will have a five-space movement and give a five-space movement to its register wheel so that when the register wheels are released, they move back to sight position with the numbers which have been set up on their respective keys showing on the register wheels. The register shaft is released at the end of the registering operation by engagement of the stud 235 on the arm 236 of the crank shaft, with the lever 237 whereby said lever is moved back to unseat the link 227 so that the register cam may be moved back to normal position by its spring. This movement of the register shaft moves the register wheel pinions out of mesh with their racks and returns the register wheels to sight position. The five register wheels, at the right of the machine, will, therefore, upon the completion of the operations described, show the sum "56325," all of the five key-posts to the right having been depressed for some definite digit and such digits now showing on the register wheels.

Movement of the lever 237 which effects release of the register cam also effects operation of the safety wing strip locks 45 which have been released by forward movement of the crank shaft, so that the posts are freed for the next operation. Backward movement of the crank shaft also causes the pin 199 to engage the hook 198 and lower the arm 197 and stud 191. This movement not only lowers the link rod 190 but moves the same backwardly so that the edge 188 on the cam 189 is moved forwardly, shifting the bar 185 to rock all of the wing latches that have held the key-posts depressed, so that the key-posts are all released and returned to set position as the crank shaft reaches its initial position, clearing the machine ready for a new operation. As the crank shaft approaches its back position, the stud 282[3] on the lever 281 picks up the arm 284 and rocks the shaft 73 to lift its detents 70, to permit unrestricted movement of the selecting bars in the next operation of the machine.

The first sum having been set up, entered on the register and printed on the record, the machine may be operated for the next sum—39.80. The operation just described is repeated for the new sum, except that the last key-post to the right will not be operated, for the reason that the cipher in the sum need not be entered by special operation of a key-post, all of the selecting bars having an automatic initial cipher movement as heretofore described. When the register wheels are operated for the second sum, there will, of course, be no advance of the right hand register wheel, which will remain at 5, the second register wheel from the right will be moved eight spaces, which, in addition to the two spaces entered at the first operation, will total 10. This necessitates a transfer of 1 to the third register wheel from the right. This transfer is effected through the mechanism shown in Figs. 16, 17, and 18, the pin 82 engaging the latch 83 as the cipher on its wheel comes to sight position, rocking the latch so that arm 92 on the third register wheel from the right can drop into the recess 93, permitting a one-space advance of the rack for the third register wheel under influence of its spring and advancing that wheel one space in addition to that which the third register wheel has advanced by movement of the selecting bar proper. The movement of the register wheels for the third and fourth banks is as heretofore described.

It has been stated that all selecting bars have initial cipher movement at each operation of the machine, but that there is no corresponding register movement. This is effected by reason of the sliding mounting of the racks on the selecting bars, the arms 92 of which engage the ends of the latches 83 and hold the racks advanced while the selecting bars continue to normal position, the retarding of the racks being equivalent to the cipher movement, so that the selecting bars proper advance without the racks for the cipher movement described.

The third sum—39.80, is the same as the second; that is, there is a repeat. This repeat may, of course, be accomplished by merely setting up the key-posts as for an ordinary operation. This set-up, however, may be avoided by use of the repeat key controlling the mechanism that ordinarily effects a clearance of the key-posts so that the key-posts are retained in the order and set position they were upon setting the original sum 39.80. This repeat mechanism does not in any way affect the ordinary operation of the register and printing mechanisms, which operate as before. The depression of the repeat key merely serves to lift the hook 198 out of the path of the pin 199 so that the stud moves idly therebeneath upon the return movement of the crank and does not operate the cam mechanism whereby the wing latches are rocked to release the key-posts; therefore, the repeat key is depressed following the setting up of the original sum 39.80, and, after the operation of the machine for the second sum, the crank is merely pulled back again after the second sum is registered and printed and the necessity of the key operation obviated.

Should the operator, for any reason, wish to clear the machine after a sum has been set up, he could do so by a slight manipulation of the crank shaft, for, as before stated, there is a slight idle anti-clockwise movement of the crank shaft upon initial operation of the handle; that is, the handle may be moved forward slightly without operating the register or printing mechanism. This idle movement is sufficient, however, to lock the pin 199 under the hook 198 so that if this slight forward idle movement is followed by a return or backward movement of the crank, the hook 198 and the cam parts connected therewith are operated to rock the wing latches and release the key-posts to clear the machine. This arrangement obviates the necessity of a special error key, although I prefer to include such special key in the machine.

If, after entering the first two sums heretofore mentioned, it is desired to take a total thereof but without interfering with the continued accumulation of the following sums, this may be accomplished by the mechanism provided for that purpose. This is what is known as taking a sub-total. The total and sub-total mechanisms are identical in the main but capable of slightly different manipulation for the total or sub-total. For a sub-total, the key-post 259 is lowered and moved to the rear, (Fig. 20) so that the register is set to operate upon forward movement of the crank shaft and remains set upon rearward movement of the shaft so that the register wheels are returned to their initial position in order that the accumulation may continue instead of starting anew. Shifting the post 259 forwardly instead of rearwardly, however, effects the release of the register wheels when the selecting bars reach the forward limit of their strokes, so that the wheels return to cipher position and have no movement upon backward movement of the selecting bars. This operation has been described in the previous description of structure. Whether in taking the total or sub-total, the register wheels are set through the link 227, which rocks the register wheel cams upon depression of the total, sub-total key-post, so that the stud 228 on the link 227 travels in the downward extension of the slot 229 instead of moving up into the right angle part thereof.

It is apparent that should the register wheels be accidently released before the total is printed, there would be an entire loss of the record and it would be necessary to repeat the operations theretofore made and cause considerable confusion. This confusion may also be caused by accidental depression of a key-post during the total-taking operation. For this reason, as soon as the total key is depressed and before control is lost of the register wheels, I lock the inactive key-posts against any depression. This is accomplished by moving the bar 59 forwardly through its connection with lever 237. The safety locks are, however, thrown back to normal position as the total key is released.

In taking the total or sub-total, the operation and control of the selecting bars is reversed from that for accumulating; that is, the movement of the selecting bars is controlled from the register wheels instead of the movement of the register wheels being controlled from the selecting bars. After the register wheels move backwardly under influence of the selecting bars, the pins 82 engage the stop portions 85 on the latches 83. When the register wheels show cipher position, the movements correspond to the extent of accumulation on the register wheels. As the register wheels are in mesh with the racks on the selecting bars, stoppage of the register wheels effects stoppage of the selecting bars although the normally controlling selecting arms continue their forward movement; consequently, the selecting bars are all under tension and would shoot forwardly as soon as the register wheels are lifted out of mesh with the racks upon initial backward or clockwise movement of the crank, were some means for preventing this sudden throw not provided. Such means, however, is provided in the limit lever or detent 70 (Fig. 8) which is operated through the arm 284 with each operation of the crank shaft, as previously described.

Referring briefly to the stop for preventing operating of the hammers in the banks to the left where no figures appear in the entry to be made:—

When the crank shaft moves forwardly, the link 180 is drawn forwardly to rock the cam 175 out of the path of the elbow on the lever arm 170. This movement of the cam is delayed, however, because of the pin and slot connection between the link and cam, until after all of the active type sectors have been set; that is, the type sectors for the banks in which key-posts have been depressed are raised to position the type for printing, and the other sectors raised to cipher position. This leaves a clear path for the stop 167 which, when the cam 175 is rocked, is permitted to move to the right until it engages the active type sector farthest to the left. This movement positions the bumper rail 168 so that it will be engaged by the type hammers directly in front of the rail; consequently, when the hammers are all thrown forward, those to the right of the rail will strike their type but those to the left of the left hand active type sector will engage the rail and be prevented from striking their type. Consequently, only those hammers are struck which are intended to print the figures in the sum set up in the register. By providing the loose mounting for the type hammers, shock and strain to the machine, which would otherwise be incidental to a sharp impact under a spring tension sufficiently strong to effectively print, is obviated, as there is no material jar on the parts connected with the hammers. On the return stroke of the crank the rocker arms 312 are moved backwardly and upon final movement rock the gripper jaws to advance the paper strip, the strip advance being retarded until after the printing has been effected, by the pin and slot 313—314 and the closing movement of the gripper jaws. The strip is advanced during the same operation of the machine in which the printing is effected, so that the printed sum may be exposed above the type hammers.

By providing the ribbon shift herein described, it is possible to automatically shift the ribbon vertically to present the black and red parts of the ribbon for ordinary accumulation and total taking respectively and automatically change the direction of the take-up of the ribbon as the ribbon approaches its limit in either direction. The ribbon shift mechanism, while operated from the slowly moving ribbon, is given a quick throw through the latch and spring operated slide so that the shift of the pawl sets is instantaneous and there is no intermediate point at which the ribbon remains stationary for any length of time, as would be the case if the shift were dependent entirely on the ribbon travel.

What I claim and desire to secure by Letters-Patent is:

1. In an adding machine, a main actuator, positioning means, a spring connecting the positioning means with the main actuator, a movable detent for the positioning means, connection between the detent and the main actuator, and a spring normally resisting primary movement of the detent, the first named spring and detent spring being tensioned in relay on primary movement of the main actuator and acting in relay to return the main actuator.

2. In an adding machine, a main actuator, positioning means, a spring connecting the positioning means with the main actuator, tensioned by primary movement of the main actuator, a detent for the positioning means operable by the main actuator, a spring restraining the detent, the detent having delayed action relative to the main actuator, whereby the first named spring and detent spring are tensioned in relay upon primary movement of the main actuator and act in relay to automatically return the main actuator and a separate spring tensioned upon the primary movement of the main actuator and acting to start the return movement of the main actuator.

3. In an adding machine, a main actuator, positioning means, a spring connecting the positioning means with the main actuator, tensioned by primary movement of the main actuator, a detent for the positioning means operable by the main actuator, a spring restraining the detent, the detent having delayed action relative to the main actuator, whereby the first named spring and detent spring are tensioned in relay upon primary movement of the main actuator, and a separate spring tensioned during primary movement of the main actuator and acting to complete return movement of the main actuator.

4. In an adding machine, a main actuator, positioning means, a spring connecting the positioning means with the main actuator, tensioned by primary movement of the main actuator, a detent for the positioning means operable by the main actuator, a spring restraining the detent, the detent having delayed action relative to the main actuator, whereby the first named spring and detent spring are tensioned in relay upon primary movement of the main actuator, and a separate spring connected with the detent and with the main actuator, tensioned in relay with the detent restraining spring and serving to complete return movement of the main actuator.

5. In an adding machine, a main actuator, a control member, a spring connecting the control member with the main actuator, operable to return the main actuator, a restraining member for the control member, operable from the main actuator, a spring connected with the restraining member, operable to return the main actuator, the restraining member having shiftable fulcrum to effect relay return operation of the control and restraining member upon return of the main actuator.

6. In an adding machine, a main actuator, a control member, operative connection between the main actuator and the control member, a second control member, yieldable, operative connection between the main actuator and the second control member, means for restraining the second control member, and positive connection between said restraining means and the first named control member.

7. In an adding machine, a main actuator, a control member, operative connection between the main actuator and the control member, a second control member, yieldable, operative connection between the main actuator and the second control member, means for restraining the second control member, positive connection between said restraining means and the first named control member, and yieldable means for returning the control members and the main actuator to initial position.

8. In an adding machine, a main actuator, a control member operatively connected with the main actuator, a second control member, means for restraining the second control member, means operatively connecting said restraining means with the main actuator, a spring for holding the restraining means during initial forward movement of the main actuator and tensioned by the restraining means during final forward movement of the actuator, a spring connecting the second control member with the main actuator, tensioned by initial forward movement of the main actuator and having idle follow travel during final forward movement of the actuator, the springs acting reversely and in relay to return the actuator and a separate spring tensioned upon the primary movement of the main actuator and acting to start the return movement of the main actuator.

9. In an adding machine, a main actuator, a positioning member, a spring connecting said positioning member with the main actuator, a fixed fulcrum member, and means operatively connected with the main actuator for restraining the positioning member, said means having primary fulcrum contact with the positioning member and having secondary fulcrum contact with said fixed fulcrum member following initial forward movement of the main actuator.

10. In an adding machine, a main actuator, a positioning member, a spring connecting said positioning member with the main actuator, a fixed fulcrum member, means operatively connected with the main actuator for restraining the positioning member, said means having primary fulcrum contact with the positioning member and secondary fulcrum contact with said fixed fulcrum member following initial forward movement of the main actuator, and a spring holding the restraining means to the positioning member during initial movement of the main actuator.

11. In an adding machine, a main actuator, a positioning member, a spring connecting said positioning member with the main actuator, a fixed fulcrum member, means operatively connected with the main actuator for restraining the positioning member, said means having primary fulcrum contact with the positioning member and secondary fulcrum contact with said fixed fulcrum member following initial forward movement of the main actuator, and a spring holding the restraining means to the positioning member during initial movement of the main actuator, the bearing surface of the positioning member being cut away to avoid contact with the restraining means during final forward movement of the main actuator.

12. In an adding machine, a main actuator, a pivoted positioning member, a spring operatively connecting the positioning member with the main actuator, means for restraining the positioning member, having crank connection with the main actuator and having hook ends comprising inclined contact faces terminating in radial faces, the restraining means comprising a fulcrum bearing engageable with the positioning member, a fixed fulcrum member engageable by the inclined and radial hook surfaces, and yielding means tensioning the restraining means toward the positioning member.

In testimony whereof I affix my signature.

LESTER C. WARNER.